United States Patent
Gronvall et al.

(10) Patent No.: US 11,960,135 B2
(45) Date of Patent: Apr. 16, 2024

(54) FIBER INDEXING SYSTEMS

(71) Applicant: CommScope Technologies LLC, Hickory, NC (US)

(72) Inventors: Erik J. Gronvall, Bloomington, MN (US); Olivier Hubert Daniel Yves Rousseaux, Brussels (BE); Trevor D. Smith, Eden Prairie, MN (US); James J. Solheid, Lakeville, MN (US); Matthew J. Holmberg, Le Center, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 18/132,634

(22) Filed: Apr. 10, 2023

(65) Prior Publication Data
US 2023/0358982 A1 Nov. 9, 2023

Related U.S. Application Data

(63) Continuation of application No. 17/194,868, filed on Mar. 8, 2021, now Pat. No. 11,650,389, which is a
(Continued)

(51) Int. Cl.
*G02B 6/44* (2006.01)
*G02B 6/38* (2006.01)
(Continued)

(52) U.S. Cl.
CPC ......... *G02B 6/4452* (2013.01); *G02B 6/3874* (2013.01); *G02B 6/3897* (2013.01);
(Continued)

(58) Field of Classification Search
CPC .. G02B 6/4452; G02B 6/3874; G02B 6/3897; G02B 6/4455; G02B 6/4471;
(Continued)

(56) References Cited

U.S. PATENT DOCUMENTS

| 4,887,883 A | 12/1989 | Darbut et al. |
| 7,264,402 B2 | 9/2007 | Theuerkorn et al. |

(Continued)

FOREIGN PATENT DOCUMENTS

| EP | 0 783 809 B1 | 11/1999 |
| EP | 1 981 185 A1 | 10/2008 |

(Continued)

OTHER PUBLICATIONS

International Search Report and Written Opinion for Application No. PCT/US2017/015149 dated Apr. 20, 2017.
(Continued)

*Primary Examiner* — Juan A Torres
(74) *Attorney, Agent, or Firm* — Merchant & Gould P.C.

(57) ABSTRACT

The present disclosure relates to systems and method for deploying a fiber optic network. Distribution devices are used to index fibers within the system to ensure that live fibers are provided at output locations throughout the system. In an example, fibers can be indexed in multiple directions within the system. In an example, spare ports can be providing in a forward direction and reverse direction ports can also be provided.

9 Claims, 31 Drawing Sheets

Related U.S. Application Data continuation of application No. 16/826,464, filed on Mar. 23, 2020, now Pat. No. 10,942,325, which is a continuation of application No. 16/214,458, filed on Dec. 10, 2018, now Pat. No. 10,606,010, which is a continuation of application No. 15/416,246, filed on Jan. 26, 2017, now Pat. No. 10,151,897.

(60) Provisional application No. 62/287,373, filed on Jan. 26, 2016, provisional application No. 62/288,263, filed on Jan. 28, 2016, provisional application No. 62/338,962, filed on May 19, 2016, provisional application No. 62/420,663, filed on Nov. 11, 2016.

(51) Int. Cl.
*H04B 10/80* (2013.01)
*H04J 14/02* (2006.01)

(52) U.S. Cl.
CPC ......... *G02B 6/4455* (2013.01); *G02B 6/4471* (2013.01); *G02B 6/4475* (2013.01); *H04B 10/808* (2013.01); *H04J 14/0204* (2013.01); *H04J 14/0297* (2013.01)

(58) Field of Classification Search
CPC . G02B 6/4475; H04B 10/808; H04J 14/0204; H04J 14/0297
USPC .......................................................... 398/70
See application file for complete search history.

(56) References Cited

U.S. PATENT DOCUMENTS

| | | | |
|---|---|---|---|
| 7,272,282 B1 * | 9/2007 | Seddon | G02B 6/4475 385/103 |
| 7,744,288 B2 | 6/2010 | Lu et al. | |
| 7,942,590 B2 | 5/2011 | Lu et al. | |
| 8,755,688 B2 | 6/2014 | Vleugels et al. | |
| 9,207,421 B2 | 12/2015 | Conner | |
| 9,438,513 B2 | 9/2016 | Gronvall et al. | |
| 9,557,498 B2 | 1/2017 | Loeffelholz | |
| 9,841,569 B2 | 12/2017 | Kmit et al. | |
| 10,151,897 B2 | 12/2018 | Gronvall et al. | |
| 10,281,660 B2 * | 5/2019 | Loeffelholz | G02B 6/3895 |
| 10,606,010 B2 | 3/2020 | Gronvall et al. | |
| 10,942,325 B2 | 3/2021 | Gronvall et al. | |
| 2010/0092129 A1 | 4/2010 | Conner | |
| 2013/0039623 A1 | 2/2013 | Zhang | |
| 2014/0254986 A1 | 9/2014 | Kmit et al. | |
| 2015/0055954 A1 | 2/2015 | Gronvall et al. | |
| 2015/0378112 A1 | 12/2015 | Marcouiller et al. | |
| 2016/0041356 A1 | 2/2016 | Wang et al. | |
| 2016/0097909 A1 | 4/2016 | Loeffelholz et al. | |
| 2016/0124173 A1 | 5/2016 | Kowalczyk et al. | |
| 2016/0223759 A1 | 8/2016 | Marcouiller et al. | |
| 2016/0238810 A1 | 8/2016 | Hubbard et al. | |

FOREIGN PATENT DOCUMENTS

| | | |
|---|---|---|
| JP | 10-32545 A | 2/1998 |
| WO | 2010/093794 A1 | 8/2010 |
| WO | 2013/149150 A1 | 10/2013 |
| WO | 2014/190281 A1 | 11/2014 |
| WO | 2015/200826 A1 | 12/2015 |
| WO | 2016/057411 A1 | 4/2016 |
| WO | 2016/137934 A1 | 9/2016 |

OTHER PUBLICATIONS

Extended European Search Report for Application No. 17744898.2 dated May 31, 2019.

* cited by examiner

FIBER INDEXING SYSTEMS

CROSS REFERENCE TO RELATED APPLICATIONS

This application is a continuation of application Ser. No. 17/194,868, filed Mar. 8, 2021 which is a continuation of application Ser. No. 16/826,464, filed Mar. 23, 2020, now U.S. Pat. No. 10,942,325, which is a continuation of application Ser. No. 16/214,458, filed Dec. 10, 2018, now U.S. Pat. No. 10,606,010, which is a continuation of application Ser. No. 15/416,246, filed Jan. 26, 2017, now U.S. Pat. No. 10,151,897, which application claims the benefit of provisional application Ser. Nos. 62/287,373, filed Jan. 26, 2016; 62/288,263, filed Jan. 28, 2016; 62/338,962, filed May 19, 2016; and 62/420,663, filed Nov. 11, 2016, which applications are incorporated herein by reference in their entirety.

TECHNICAL FIELD

The present disclosure relates generally to equipment for fiber optic communications networks. More particularly, the present disclosure relates to the components of passive optical networks and methods for deploying the same.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

Aspects of the present disclosure relate to systems managing, installing and expanding the capacity of an indexed fiber optic network. In certain examples, the indexed fiber optic network is configured to accommodate network expansion through the use of coarse wavelength division multiplexers (CWDM) or dense wavelength division multiplexers (DWDM). In certain examples, the system can include an indexed PON architecture with a CWDM or DWDM overlay. In certain example, network management and port allocation can be accomplished at a fiber distribution hub. Example indexing architectures and components are disclosed in U.S. patent application Ser. No. 14/285,949 which is hereby incorporated by reference in its entirety.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
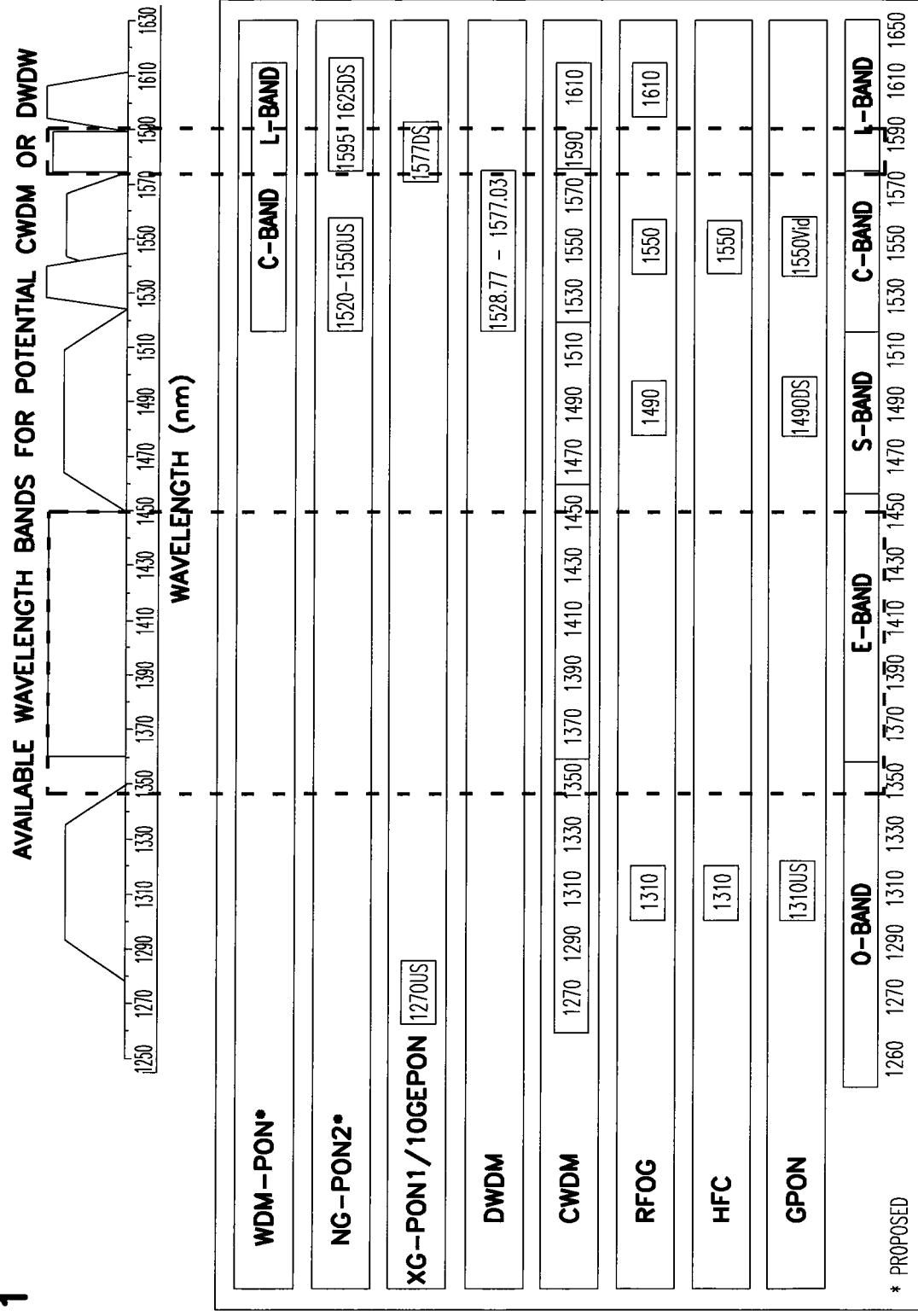
FIG. 1 is a chart shown wavelength bands corresponding to different optical services.

FIG. 1 shows different wavelength bands corresponding to different optical network platforms. Generally, a traditional passive optical network (GPON) utilizes a 1310 nanometer wavelength within the O-band and a 1490 nanometer wavelength in the S-band. A GPON network can also have a 1550 nanometer wavelength overlay from the C-band for video. Certain aspects of the present disclosure relate to the use of wavelength division multiplexing to expand wavelength availability for existing or future GPON networks. In certain examples, certain wavelengths in the E-band can be utilized using coarse wavelength division multiplexing (CWDM) and can be used to expand the capacity or provide additional services on optical fibers designated for a GPON network. Example wavelengths from the E-band can include 1350 nanometers, 1370 nanometers, 1390 nanometers, 1410 nanometers, 1430 nanometers and 1450 nanometers. In certain examples, the 1590 nanometer wavelength area could be broken down into a plurality (e.g., ten) of dense wavelength division multiplexer (DWDM) channels.

Figure 2:
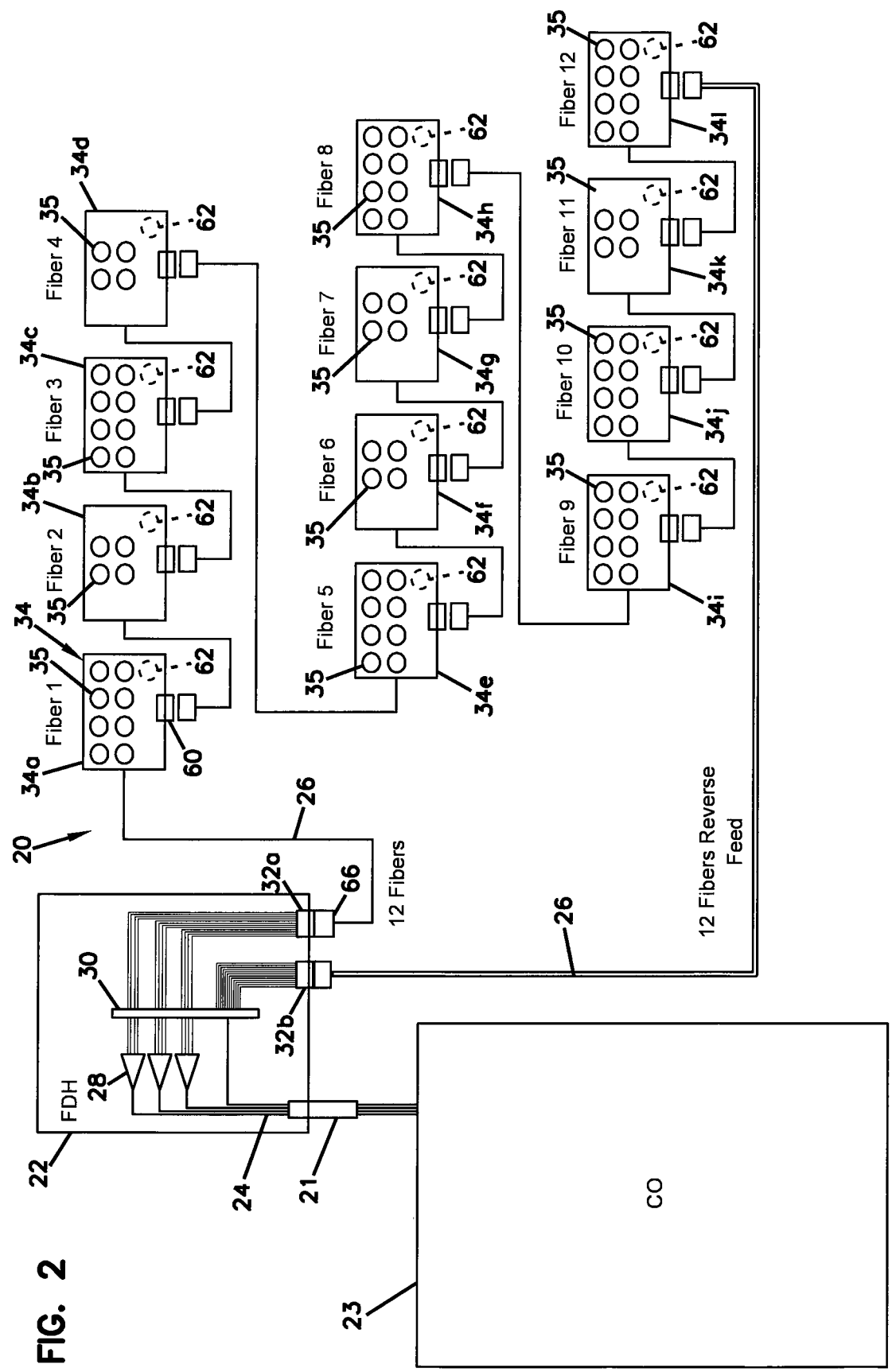
FIG. 2 is a schematic diagram of an example distributed optical network including indexing components daisy-chained together and arranged in a loop so that service can be provide in a forward and reverse direction.

FIG. 2 illustrates a fiber optic network architecture 20 in accordance with the principles of the present disclosure. It will be appreciated that the fiber optic network architecture 20 is suited for supporting a GPON network with certain CWDM or DWDM channels overlaid over the GPON channels. For example, CWDM technology can be used to overlay a 1370 nanometer wavelength, a 1390 nanometer wavelength, 1410 nanometer wavelength and a 1430 nanometer wavelength over standard GPON wavelengths such as 1310 nanometers and 1490 nanometers.

Referring to FIG. 2, the fiber optic network architecture 20 includes a fiber distribution hub 22 that receives F1 cables 21 from a central location such as a central office 23. An F1 cable is typically a cable located closer to the center of a fiber optic network while F2 cables are generally closer to the edge of a fiber optic network. Each of the F1 cables 21 can include a plurality of F1 optical fibers 24. The fiber distribution hub 22 can function as a distribution point for managing optical connections between the F1 optical fibers 24 and optical fibers corresponding to an F2 portion 26 of the fiber optic network architecture 20. It will be appreciated that the fiber distribution hub 22 can include a cabinet (i.e., a housing or enclosure) that contains optical components such as passive optical splitters 28 and patch panels 30. The fiber distribution hub 22 can also include multi-fiber connection locations 32a, 32b that interface with the F2 portion 26 of the fiber optic network architecture 20. In certain examples, the F2 portion 26 of the fiber optic network architecture 20 can include a plurality of indexing components 34 that are daisy-chained together and optically connected in a loop with respect to the fiber distribution hub 22. The loop can start at multi-fiber connection location 32a and extend through the daisy-chain of indexing components 34 and then return to the multi-fiber connection location 32b to complete the loop. The multi-fiber connection location 32a can be referred to as a forward feed connection location and the multi-fiber connection location 32b can be referred to as a reverse feed connection location. Signals can be forward-fed from the fiber distribution hub 22 to the F2 portion 26 of the fiber optic network architecture 20 through the multi-fiber connection location 32a. Signals can be reverse-fed through the F2 portion 26 of the fiber optic network architecture 20 through the fiber optic connection location 32b.

It will be appreciated that the multi-fiber connection locations 32a, 32b can each include a multi-fiber ferrule supporting a plurality of optical fibers. The multi-fiber connection locations can be demateable in the same way fiber optic connectors re demateable. By way of example, each of the multi-fiber ferrules can support 12 fibers, 24 fibers, 36 fibers, 48 fibers, 72 fibers, 96 fibers, 144 fibers, 288 fibers, or other numbers of optical fibers. It will be appreciated that the multi-fiber connection locations 32a, 32b can be provided on panels, bulkheads or other structures. In certain examples, the multi-fiber connection locations include multi-fiber ferrules as indicated above. In certain examples, multi-fiber ferrules can be incorporated as part of non-ruggedized fiber optic connectors such as MPO connectors. The non-ruggedized fiber optic connectors can be interconnected to multi-fiber optical connectors corresponding to fiber optic distribution cables routed from the fiber distribution hubs by multi-fiber fiber optic adapters that can be mounted in an organized way such as on a bulkhead, on a panel, on a wall of the FDH cabinet, on sliding adapter packs, or on other structures configured to provide relatively high density. In this type of configuration, cables connected to the multi-fiber connection locations 32a, 32b can be routed into the FDH through seals such that the fiber optic connectors are not required to be ruggedized. In other examples, the multi-fiber connection locations 32a, 32b can include multi-fiber ferrules mounted at ruggedized multi-fiber ports that are environmentally sealable and that can be accessed from outside the fiber distribution hub without having to access the interior of the fiber distribution hub. It will be appreciated that the ruggedize multi-fiber ports can be arranged in arrays on a side of the FDH cabinet. In other examples, the ruggedized multi-fiber ports can be provided on ruggedized tethers routed outside of the FDH cabinet through seals. In still other examples, the ruggedized multi-fiber ports can be provided on bulkheads or other structures inside or outside the cabinet. Further, in certain examples, separate arrays, arrangements or groups of ruggedized multi-fiber ports can be provided corresponding to forward-feed applications and reverse-feed applications. In certain examples, the FDH can be equipped with at least four, eight, sixteen, thirty-two, or sixty-four ruggedized multi-fiber ports. It will be appreciated that the ruggedized multi-fiber ports and ruggedized multi-fiber connectors that are disclosed by U.S. Pat. No. 7,264,402; PCT Publication No. WO2014/190281; and PCT Publication No. WO2013/077969, all of which are hereby incorporated by reference in their entireties, are examples of ruggedized multi-fiber ports and ruggedized multi-fiber optic connectors mentioned throughout this disclosure.

Figure 3:
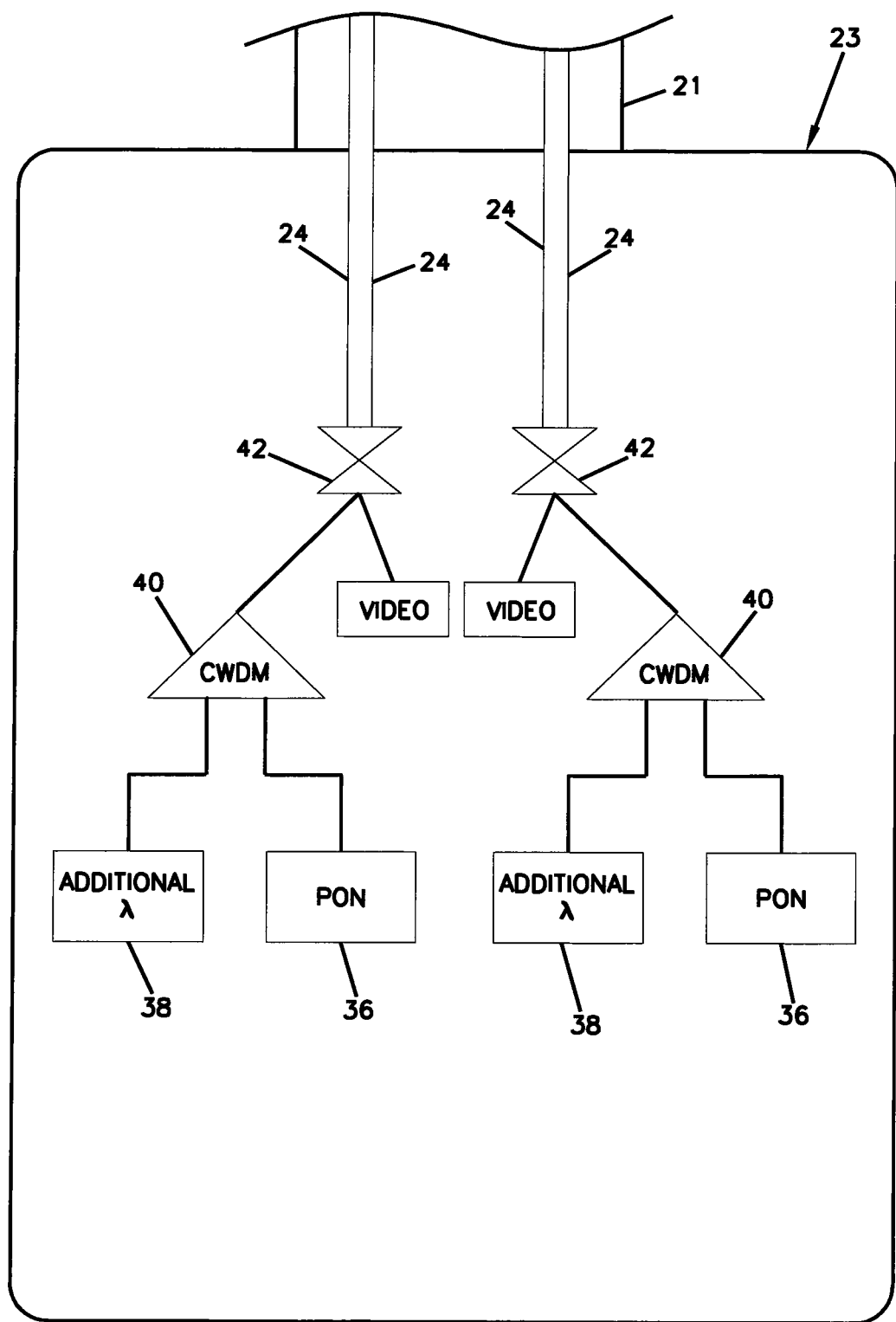
FIG. 3 schematically shows an example central office configuration for providing PON and CWDM overlaid service.

FIG. 3 shows an example configuration for the central office 23. In certain examples, the central office 23 can include PON interfaces 36 for supporting a GPON network, and additional wavelength interfaces 38 for supporting additional wavelengths such as CWDM wavelengths (e.g., 1370 nanometers, 1390 nanometers, 1410 nanometers, 1430 nanometers, 1350 nanometers, 1450 nanometers, and 1590 nanometers) or DWDM wavelengths. Signals supporting the standard GPON network are merged (i.e., overlaid) with the additional wavelength signals by wavelength division multiplexers 40 such as CWDMs or DWDMs. The overlaid signals are merged with video signals at combiners 42 (e.g., 2×2 combiners) which combine the signals and then split the combined signals into two F1 signals (each including PON, CWDM and video) that are transmitted through the F1 optical fibers 24 to the fiber distribution hub 22.

Figure 4:
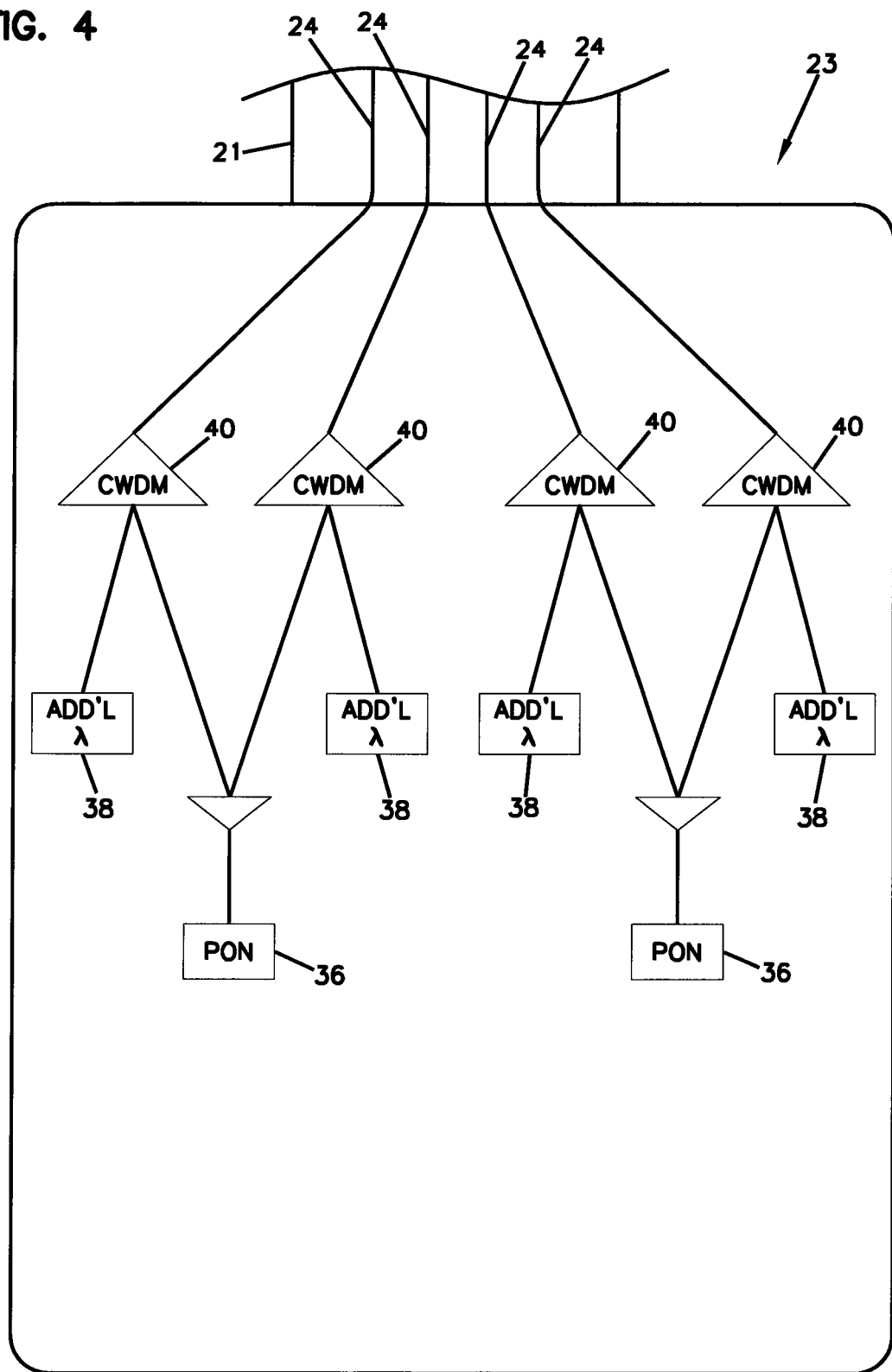
FIG. 4 schematically shows another example central office configuration for providing PON and CWDM overlaid service.

FIG. 4 shows an alternative configuration for the central office 23. In this configuration, video has been eliminated and PON splitting has been positioned upstream from the wavelength division multiplexers 40. By not splitting the signals with the additional wavelengths (e.g., the CWDM wavelengths) at the central office, the number of terminals that share the additional wavelength signals from the same source (i.e., the same additional wavelength interface 38) is reduced.

Figure 5:
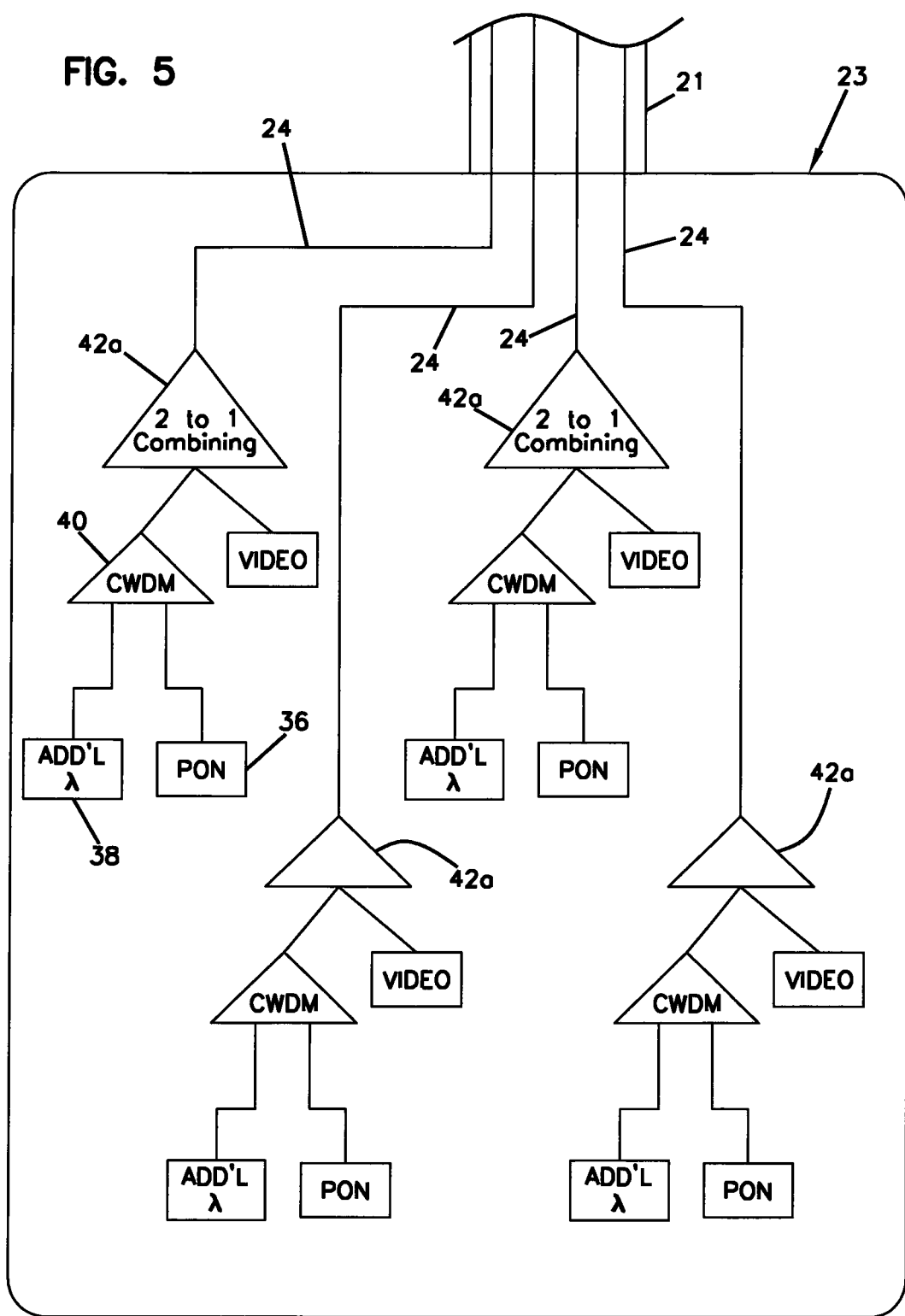
FIG. 5 schematically shows a further example central office configuration providing PON and CWDM overlaid service.

FIG. 5 shows still another configuration for the central office 23. In this configuration, the 2×2 combiners 42 have been replaced by 2×1 combiners 42a. In this way, the DWM signals from source 38 and the PON signals from source 36 are not passively split at the central office 23. In this way, the ability to split can be forced or pushed farther out into the network closer to the network edge. This allows each of the fibers 24 to support twice as many drops. Therefore, one way to retrofit a system to increase the number of drops that can be supported by existing fibers in the network is to replace 2×2 combiners at the central office with 2×1 combiners at the central office.

Figure 6:
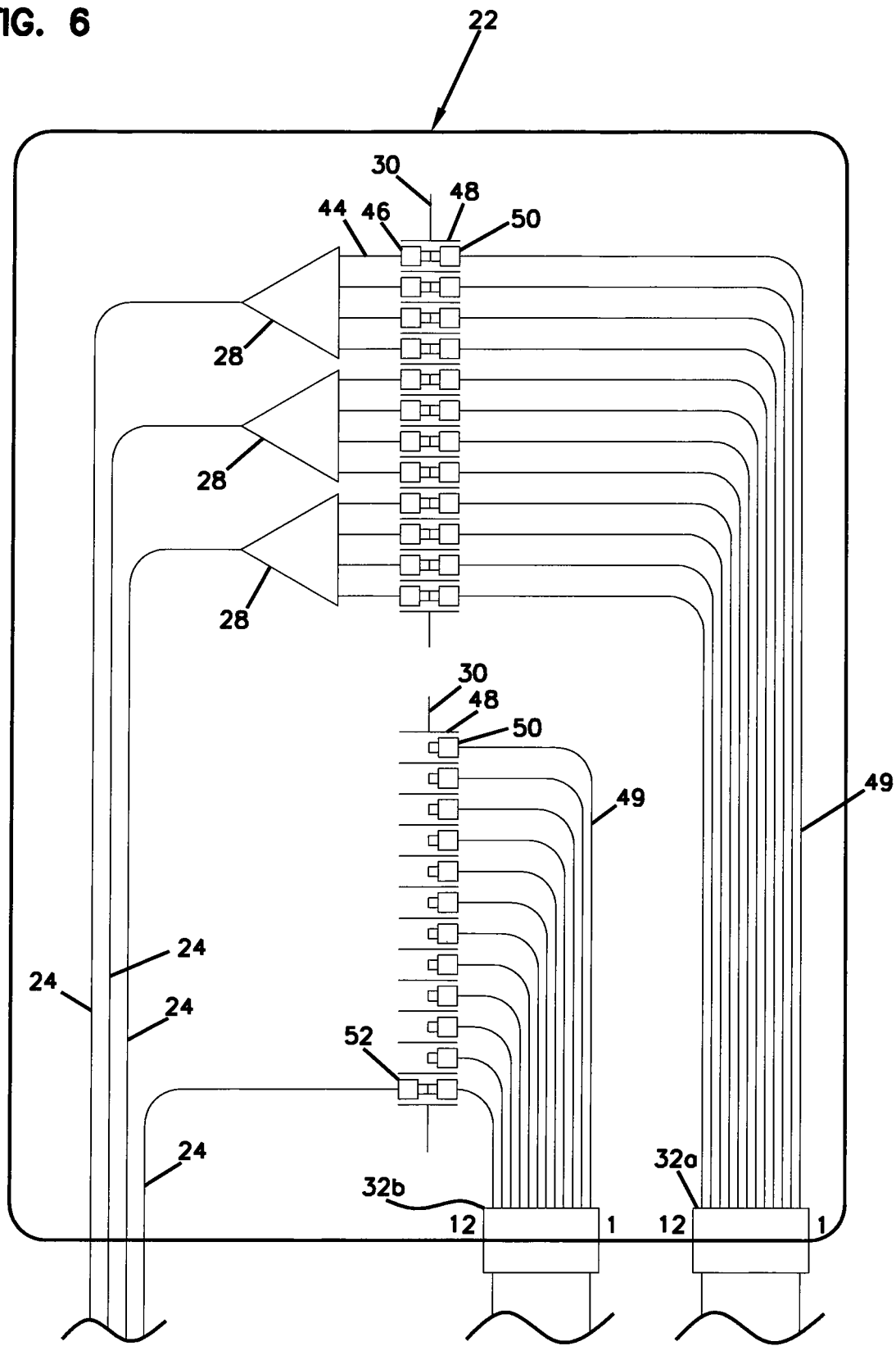
FIG. 6 schematically shows an example Fiber Distribution Hub (FDH) configuration for use in the network architecture of FIG. 2.

Referring to FIG. 6, the fiber distribution hub 22 is depicted including three passive optical power splitters 28 each being fed by one of the F1 optical fibers 24. The passive optical splitters 28 are shown as being 1×4 splitters. In other examples, passive optical splitters can include 1×8 splitters, 1×16 splitters, 1×32 splitters, or splitters having other split ratios. The outputs of the optical splitters 28 are shown including connectorized pigtails 44 having ends terminated by single-fiber optical connectors 46 such as SC-type connectors, LC-type fiber optic connectors or other type of fiber optic connectors. The fiber optic connectors 46 are installed (e.g., loaded, inserted) within ports of fiber optic adapters 48 provided at the patch panels 30. It will be appreciated that the fiber optic adapters 48 can be configured for optically connecting together two fiber optic connectors. A typical fiber optic adapter 48 can include a ferrule alignment sleeve that receives and coaxially aligns the ferrules of two mated fiber optic connectors so that light can be conveyed between optical fibers supported within the ferrules.

Fiber harnesses can also be used to optically connect the multi-fiber connection locations 32a, 32b to the outputs of the passive optical splitters 28 and/or directly to pass-through F1 optical fibers 24 at the patch panels 30. The optical fiber harnesses can include optical fibers 49 having first ends terminated at multi-fiber ferrules located at the multi-fiber connection locations 32a, 32b and second ends terminated by single fiber optical connectors 50 installed in ports of the fiber optic adapters 48 at the patch panels 30. It will be appreciated that the patch panels 30 function to optically couple the single-fiber optical connectors 50 to the single-fiber optical connectors 46 of the connectorized pigtails 44. The patch panels 30 can also function to optically couple the single-fiber optical connectors 50 to F1 optical fibers 24 connectorized by a single-fiber optical connectors 52.

Referring back to FIG. 2, the indexing components 34 can include indexing components 34a-34l daisy-chained together in series with component 34a being first in the chain and component 34l being last in the chain when moving in a forward direction along the chain. It will be appreciated that the indexing components 34a-34l have the same basic configuration except for different passive power split ratios are provided. For example, each indexing component 34a, 34c, 34e, 34h, 34i, 34j and 34l has an internal passive optical power splitter with a split ratio of 1×8 so that each of such components is provided with 8 GPON drop ports 35. Each indexing component 34b, 34d, 34f, 34g and 34k has an internal passive optical power splitter with a split ratio of 1×4 so that each of such components is provided with 4 GPON drop ports 35. The GPON drop ports 35 can be ruggedized optical ports and can include fiber optic adapters configured to optically connect the outputs of the component optical splitters to ruggedized fiber optic connectors mated with the ports 35. The ruggedized fiber optic connectors can terminate the ends of cables such as drop cables routed to subscriber locations. The ruggedized connectors can mate in a sealed interface with the ports 35 and can be secured within the ports by robust mechanical connection interfaces such as threaded connections or bayonet-type connections.

Figure 7:
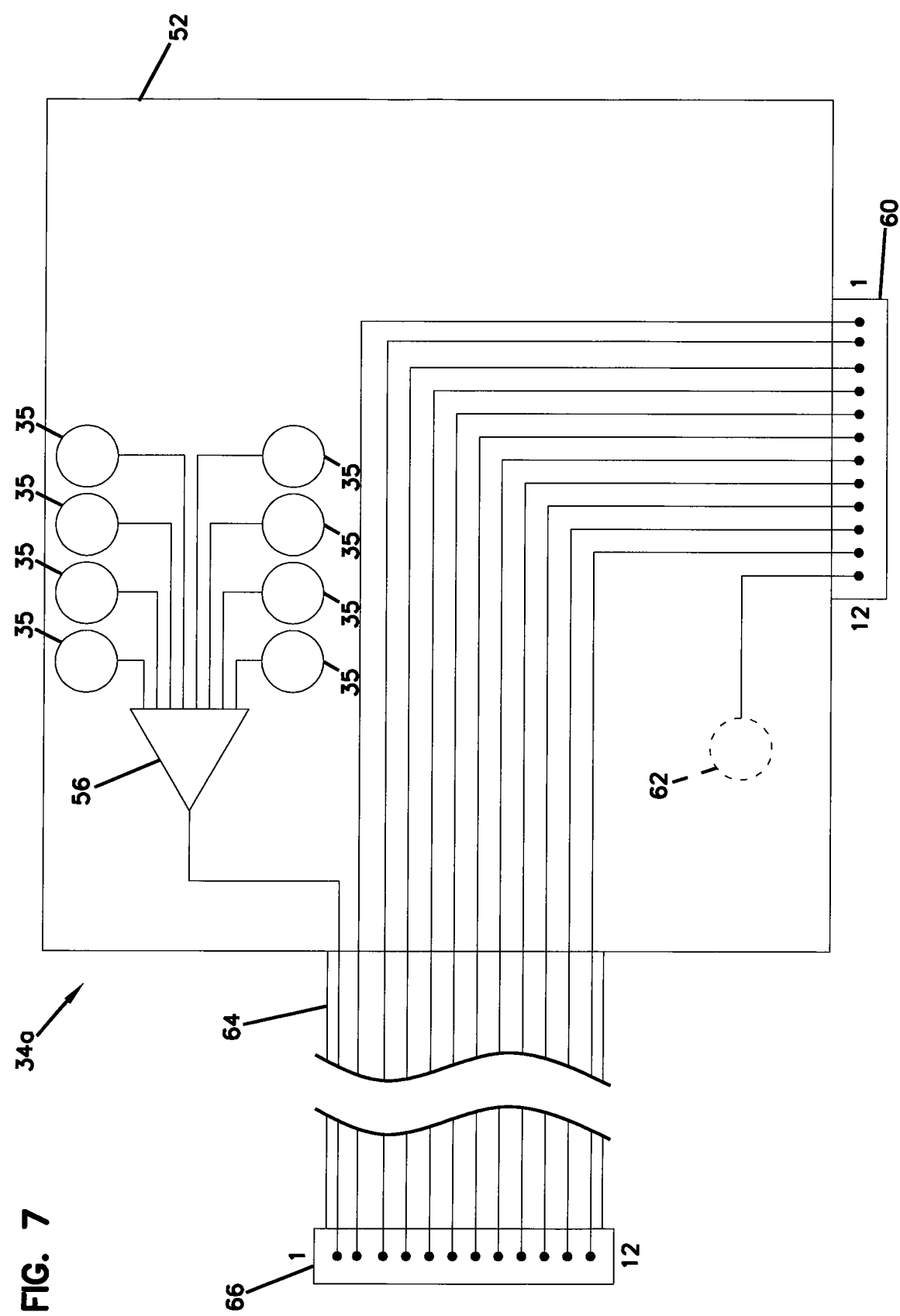
FIG. 7 is a schematic diagram of an example indexing component suitable for use in the distributed optical network of FIG. 2.

FIG. 7 is a schematic diagram of one of the indexing components 34a. The indexing component 34a includes a terminal housing 52 at which 8 of the GPON drop ports 35 (i.e., fiber optic adapter ports for receiving fiber optic connectors) are provided. The drop ports 35 are optically coupled to corresponding to outputs of a passive optical power splitter 56 housed within the terminal housing 52. The GPON drop ports 35 are each preferably ruggedized single-fiber fiber optic adapters configured for receiving and optically connecting with a ruggedized single-fiber fiber optic connector. Example configurations for the ruggedized single-fiber fiber optic adapters as well as the ruggedized single-fiber fiber optic connector are disclosed by U.S. Pat. No. 7,744,288, which is hereby incorporated by reference in its entirety. The ruggedized fiber optic adapter ports are preferably carried with the terminal body 52.

Referring still to FIG. 7, the indexing component 34a includes a first multi-fiber connection location 66 for providing multi-fiber optical connections. The first multi-fiber connection location 66 can also be referred to as an upstream connection location since it is on the upstream side of the component when communications are moving in a forward direction through the component. The first multi-fiber connection location 66 can be provided at the terminal 52. Alternatively, as depicted the first multi-fiber connection location 66 can be provided by a multi-fiber fiber optic connector (e.g., an HMFOC as described below) mounted at the end of a fiber tether or stub 64 having optical fibers routed into the terminal 52. The first multi-fiber fiber optic connection location 66 can include a multi-fiber ferrule supporting ends of the plurality of optical fibers routed through the tether to the terminal 52. The indexing component 34a also includes a second multi-fiber connection location 60 for providing optical connections with a multi-fiber fiber optic connector. The second multi-fiber connection location 60 can also be referred to as a downstream connection location since it is on the downstream side of the component when communications are moving in a forward direction through the component. The second multi-fiber connection location 60 can include a multi-fiber ferrule supporting the ends of optical fibers routed from the first multi-fiber connection location 66. The optical fibers can be indexed such that the ends of the optical fibers at the first multi-fiber connection location 66 are at different fiber positions within the ferrule as compared to the fiber positons of the opposite ends of the optical fibers within the ferrule of the second multi-fiber connection location 60. In certain examples, the multi-fiber connection location 60 is adapted to interface with a hardened multi-fiber fiber optic connector (HMFOC) of the type disclosed by International Application No. PCT/US2014/039377, which is hereby incorporated by reference. The indexing component 34a further includes a reverse-feed drop port 62 optically coupled to one of the fiber positions of the first multi-fiber fiber optic connection location 60. The reverse-feed drop port 62 can include a ruggedized single-fiber fiber optic adapter of the type described above.

As shown, the fiber optic connection location 66 includes a multi-fiber ferrule supporting first ends of twelve optical fibers at 12 positions numbered 1-12. Similarly, the multi-fiber connection location 60 includes a multi-fiber ferrule supporting second ends of eleven of the twelve optical fibers at positions numbered 1-11. The optical fiber corresponding to position 1 of the fiber optic connector 66 is optically connected to an input side of the optical splitter 56. The optical fibers corresponding to positions 2-12 of the fiber optic connector 66 are coupled respectively to positions 1-11 of the multi-fiber ferrule of the multi-fiber connection location 60. Thus, the optical fibers are indexed one position relative to one another. Fiber position 12 of the multi-fiber connection location 60 is optically coupled to the reverse-feed port 62.

Referring back to FIG. 2, the optical fibers connected through the multi-fiber connection location 32a are adapted to provide GPON service to the ruggedized ports 35 of the terminals 52 of the indexing components 34. In this configuration, fibers 1-12 of the multi-fiber connection location 32a respectively support terminals 34a-34l. Each of the optical fibers supporting the terminals in the forward direction can include GPON signals as well as the additional wavelength signals (e.g., CWDM signals). In certain examples, F1-fibers can pass un-split through the FDH and can be used to provide service through the multi-fiber connection location 32b to the reverse-feed ports 62 of the terminals. In certain examples, the F1 fibers coupled to the daisy-chain via the multi-fiber connection location 32b can provide up to 18 CDWM wavelengths per fiber to the reverse-feed ports 62. By plugging the F1 fiber to the appropriate port on the patch panel 30, the reverse-feed port 62 of a selected terminal can be optically connected to the F1 fiber directly. As shown at FIG. 5, the un-split pass-through F1 fiber is shown optically coupled to the 12th fiber of the reverse-feed multi-fiber connection location 32b. Thus, the F1 fiber is optically connected to the reverse-feed port 62 of the last indexing component 34l in the daisy-chain of indexing components 34.

Figure 8:
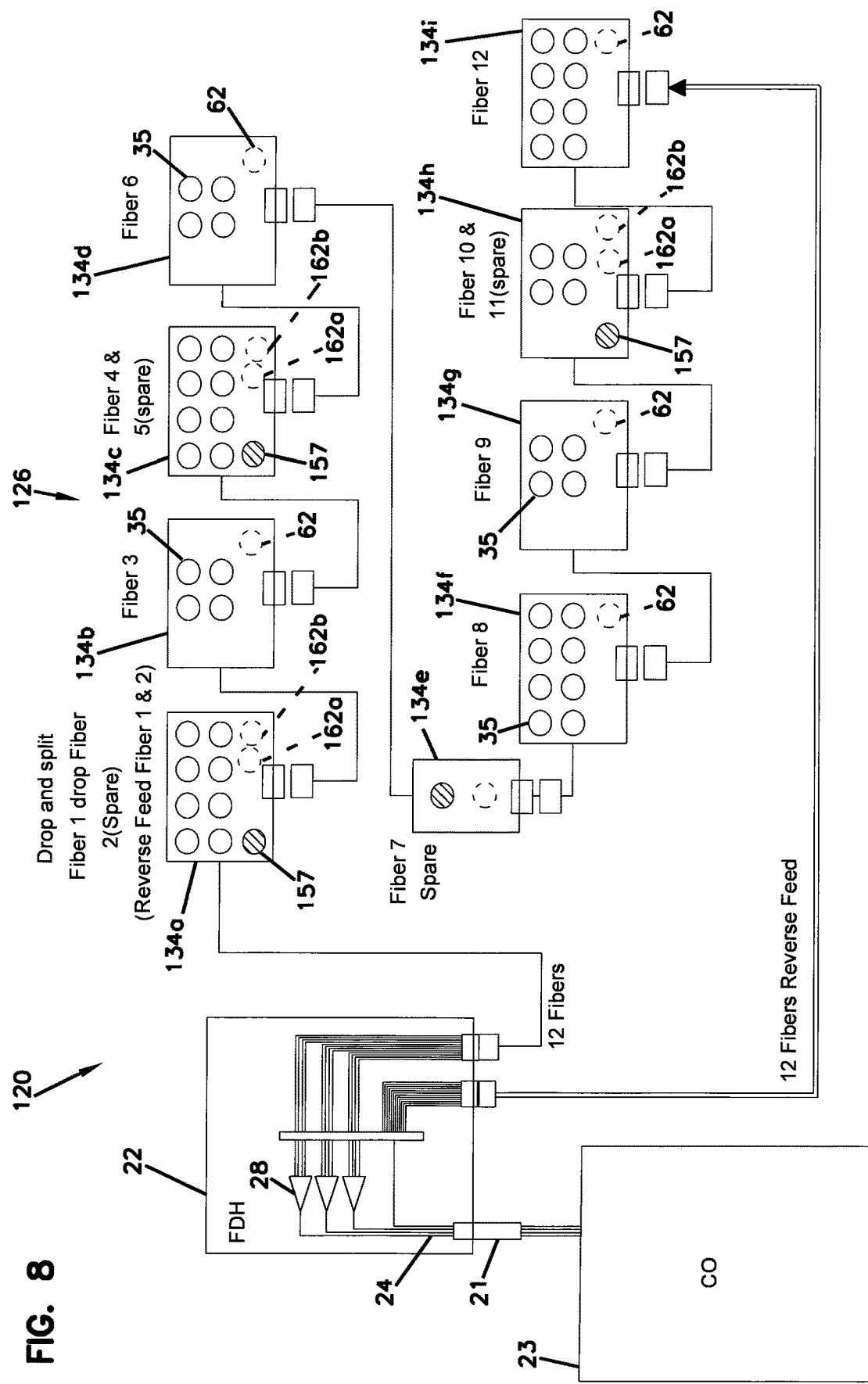
FIG. 8 schematically illustrates another fiber optic network architecture in accordance with the principles of the present disclosure, the architecture includes indexing components with internal splitters feeding GPON access ports, and also including spare forward feed ports and reverse feed ports.

FIG. 8 depicts a further fiber optic network architecture 120 in accordance with the principles of the present disclosure. The fiber optic network architecture 120 can include a fiber distribution hub 22 of the type described above that receives F1 optical fibers 24 from a central office 23. As described above, the central office 23 can support both a traditional GPON network and can also provide a CWDM or DWDM overlay. The fiber optic network architecture 120 can include an F2 portion 126 that is similar to the F2 portion 26 in that a number of indexing components 134a-134i have been daisy-chained together and connected in a closed loop with respect to the fiber distribution hub 22. In the F2 portion 126, a number of the indexing components 134a, 134c, 134e and 134h have been configured so as to have spare ports which are not coupled to the outputs of the component splitters. Such spare ports are intended to be supported by a forward-feed from the fiber distribution hub and are intended to output signals that have not been optically power split within the F2 portion of the network (i.e. the signals have not been power split downstream of the FDH). Components 134b, 134d, 134f, 134g and 134i have the same structure as the indexing components with comparable split ratios disclosed with respect to the architecture 20 of FIG. 2.

Figure 9:
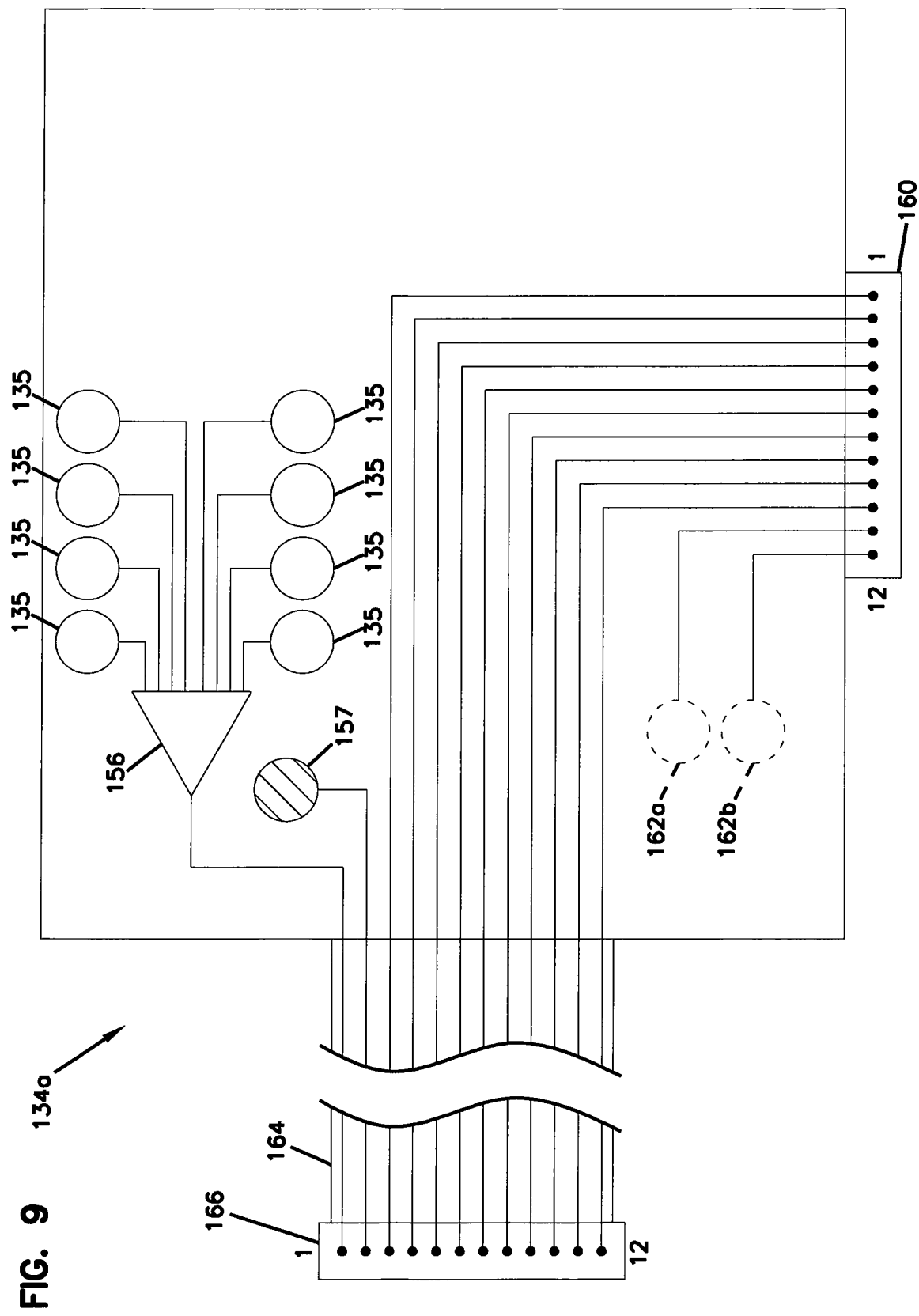
FIG. 9 schematically illustrates one of the indexing components of FIG. 7.

FIG. 9 shows an example indexing component 134a used in the F2 portion 126 of the network architecture 120. Component 134c has the same structure as component 134a and components 134h has the same structure as component 134a except for a reduced split ratio. The component 134a of FIG. 8 includes a first multi-fiber connection location such as an input tether 164 terminated by a hardened multi-fiber fiber optic connector 166 having a multi-fiber ferrule. The multi-fiber ferrule supports 12 fibers numbered 1-12. The indexing component 134a further includes a second multi-fiber connection location 160 having a multi-fiber ferrule supporting 12 fibers numbered 1-12. The tether 164 is routed to a terminal housing and the multi-fiber connection location 160 is provided at the terminal housing. The first fiber of the tether 164 is routed to a passive optical splitter 156 whose outputs are routed to ruggedized single-fiber fiber optic adapter ports 135 (i.e., drop ports such as GPON drop ports). The second fiber of the tether 164 is routed to a spare drop port 157 that can be configured as a single-fiber ruggedized fiber optic adapter port. Fibers 3-12 of the tether 164 are respectively connected in an indexed fashion to positions 1-10 of the multi-fiber connection location 160. Positions 11 and 12 of the multi-fiber connection location 160 are optically connected to reverse-feed ports 162a, 162b each being configured as a ruggedized fiber optic adapter port.

Figure 10:
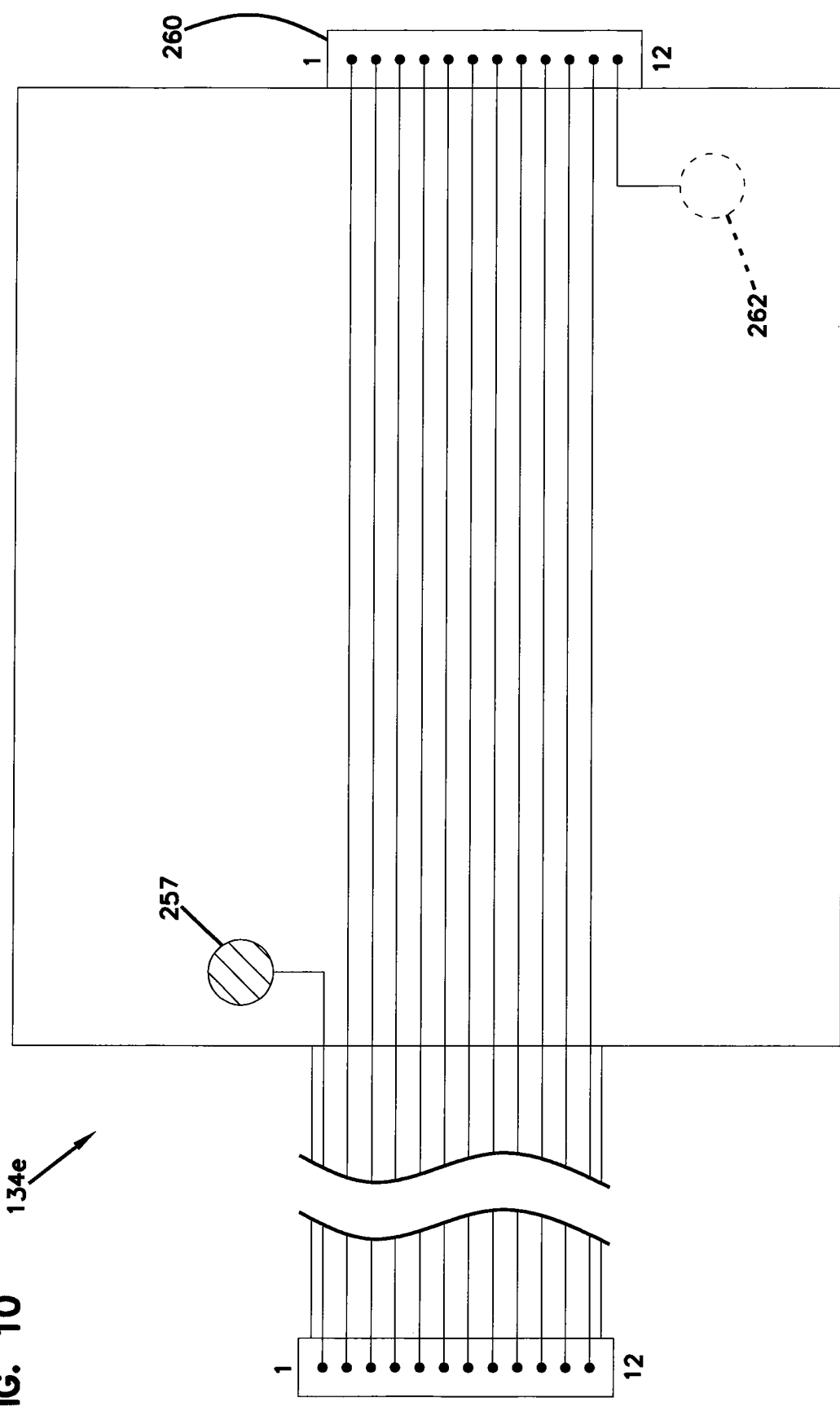
FIG. 10 schematically illustrates another one of the indexing components of FIG. 7.

FIG. 10 shows an indexing component 134e of the network architecture 120 having a terminal with a single forward-feed port 257 and a single reverse-feed port 262. The ports 257, 262 can be configured as ruggedized fiber optic adapter ports. Fiber 1 of a forward-feed tether of the component 134e is optically coupled to the forward-feed port 257. Fiber 12 of a multi-fiber connection location 260 of the component 234 is shown optically coupled to the reverse-feed port 262. Fibers 2-12 of the forward-feed tether are connected in indexed fashion to positions 1-11 of the multi-fiber connection location 260.

Figure 11:
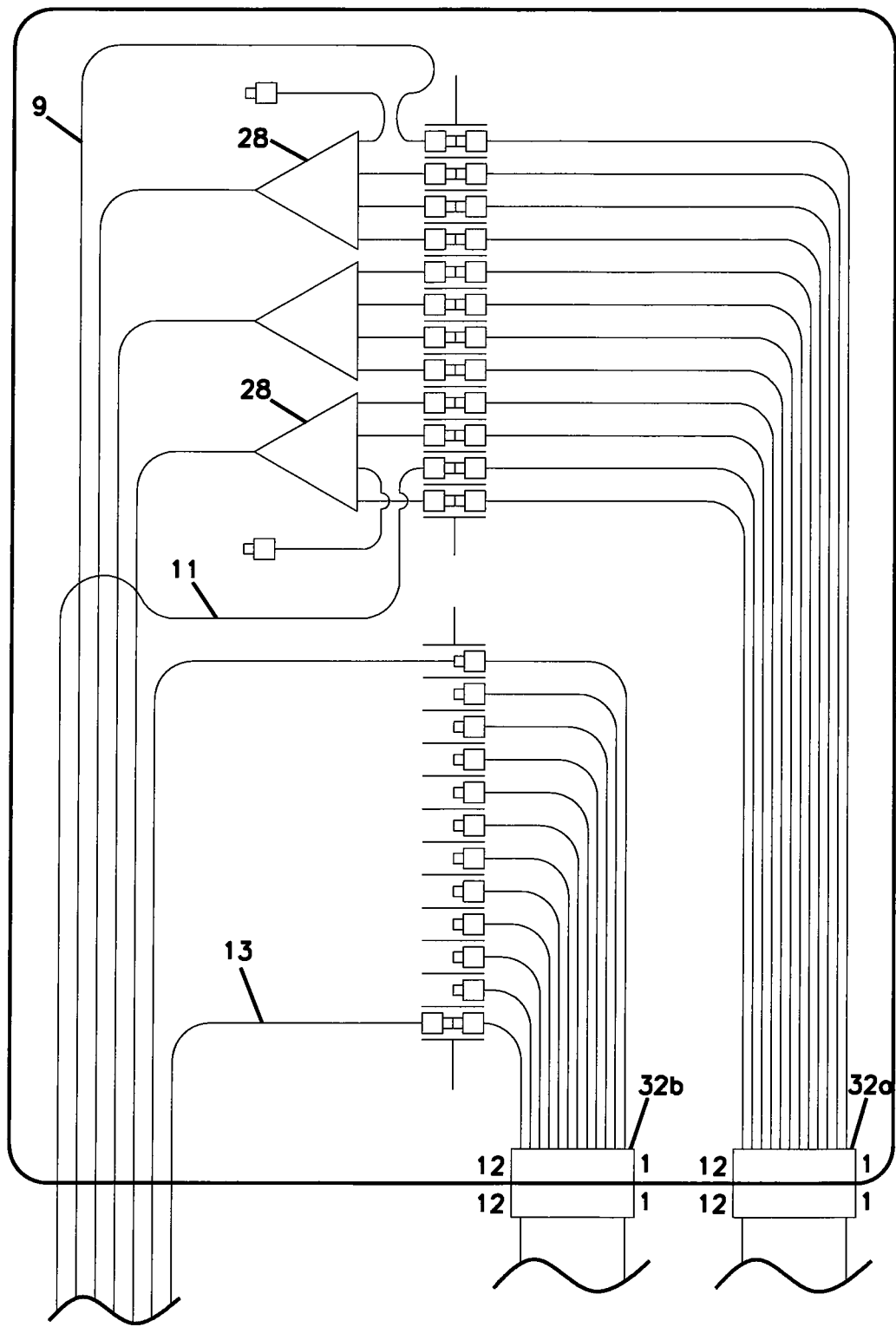
FIG. 11 schematically illustrates a Fiber Distribution Hub of the architecture of FIG. 8.

With the fiber optic network architecture 120 of FIG. 8, the spare ports 157, 257 provide means for supplying selected terminals with up to 18 CWDM channels per spare drop port from an F1 fiber in a forward direction. This can be achieved by plugging the F1 fiber into the appropriate patch panel port such that the F1 fiber is connected to the fiber line corresponding to the particular spare terminal port. For example, as shown at FIG. 10, F1 fibers 9, 11 have been coupled to fiber 1 and 11 of the multi-fiber connection location 32*a* which correspond to the spare ports 157 of components 134*a*, 134*h*. The multiple reverse-feed ports allow multiple F1 fibers to be coupled to a particular terminal in a reverse-feed direction. In this way, multiple customers or subscribers adjacent to the terminal can be provided with up to 18 CWDM channels per reverse-feed port from the reverse-feed. FIG. 11 shows a F1 fiber 13 coupled to the reverse feed port 162 of component 134*i*.

It will be appreciated that an extra F1 fiber typically be used for each spare port activated and for each reverse-feed port activated. A mapping scheme can be utilized to record the port layout of the F2 portion 126 such that each adapter port in the FDH is assigned to a corresponding port or ports of the F2 portion 126. In this way, service can be administered at the FDH by plugging the splitter outputs and the F1 fibers into the appropriate ports provided at the patch panels.

Figure 12:
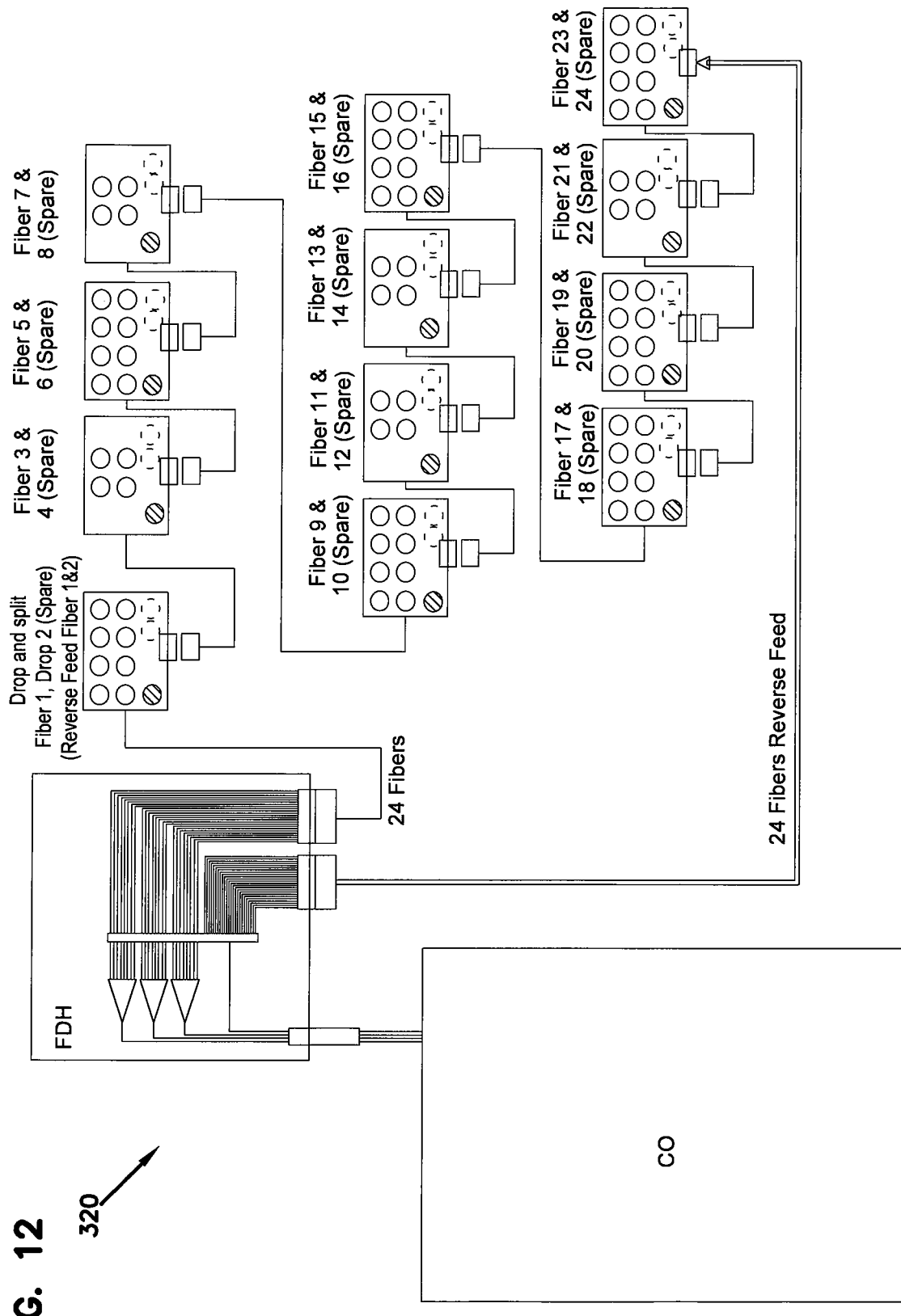
FIG. 12 schematically illustrates a further network architecture in accordance with the principles of the present disclosure, the architecture includes indexing components daisy chained together with the use of 24 fiber cable sand 24 fiber multi-fiber connectors/connection locations.
Figure 13:
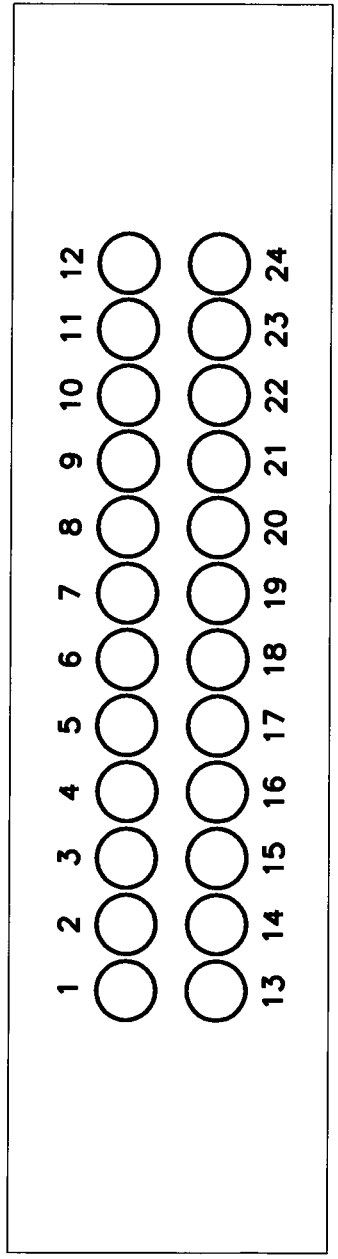
FIG. 13 is an end view showing a fiber lay-out of a 24 fiber ferrule of a 24 fiber optical connector.
Figure 14:
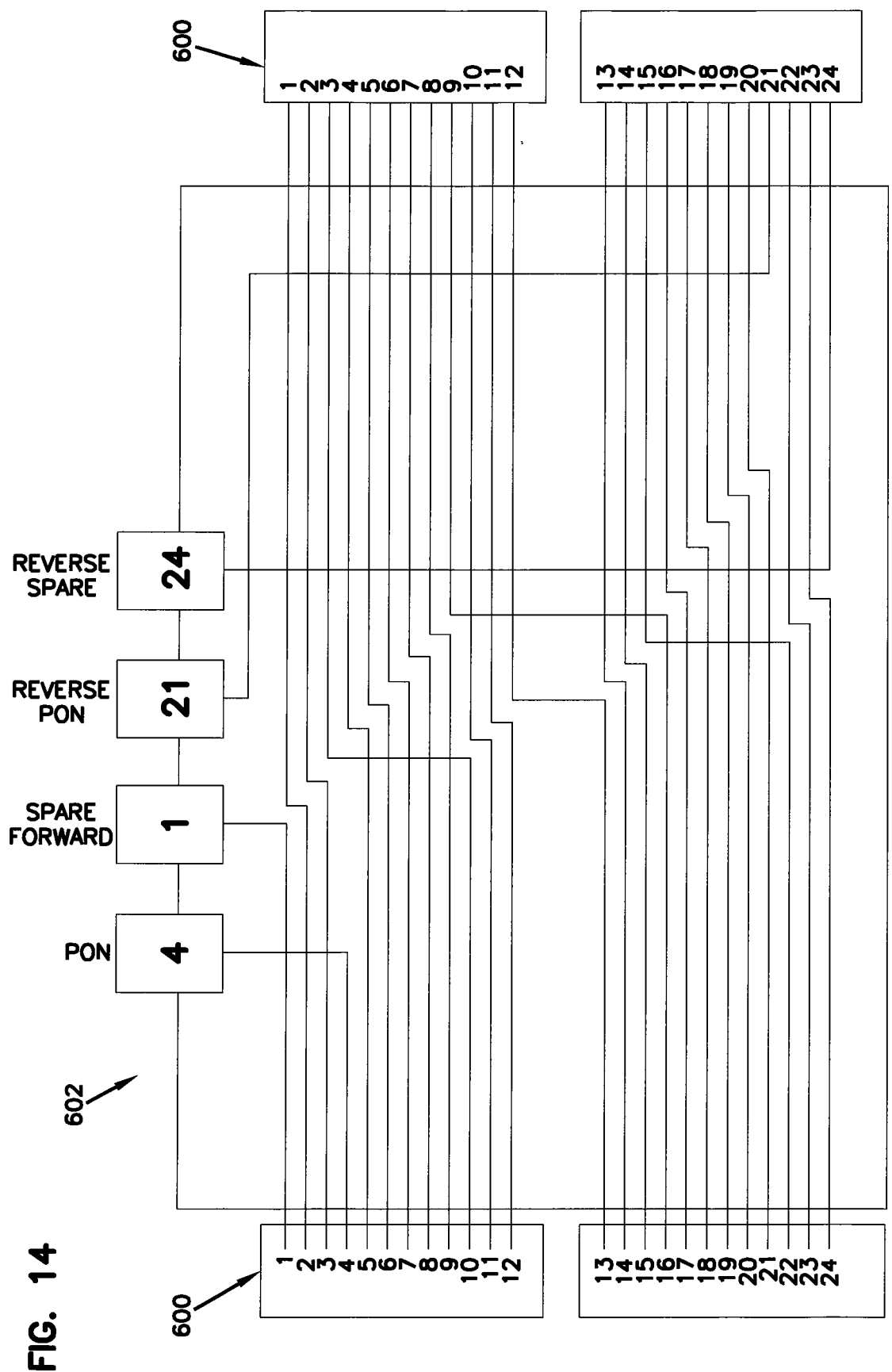
FIG. 14 illustrates an indexing scheme suitable for use with indexing components having 24 fiber optical connections.

FIG. 12 shows another network architecture 320 in accordance with the principles of the present disclosure. The network architecture of FIG. 12 is similar to the network architecture of FIG. 7 except that multi-fiber connectors and multi-fiber cables having 24 fibers have been utilized so as to provide additional fibers to the daisy chain of indexing components. FIG. 13 shows a typical fiber positioning layout for a 24-fiber ferrule 600. In one example, when using 24 fiber connectors to support a network architecture having cascaded indexing components, up to 12 fibers can be used for GPON and the remaining 12 optical fibers can be used as spare fibers to provide other services as needed. To reduce loss on the GPON fibers it is possible to take advantage of the natural lower loss on center fibers in a 24-fiber MPO connector. For example, the 12 centermost fibers (e.g., fibers 4-9 and 16-21) can be used as a first indexing subset to provide support for GPON services, while the outer optical fibers (positions 1-3, 10-12, 13-15 and 22-24) can provide a second indexing subset that supports the spare ports. FIG. 14 shows an indexing device 602 having two separate subsets of fibers that are routed between two twenty-four fiber ferrules 600. As shown at FIG. 14, fiber 4 is dropped to a GPON port in a forward direction and fiber 21 is dropped to a GPON port in a reverse direction. Also, fibers 5-9 are indexed to positions 4-8, respectively, and fibers 16-21 are indexed to positions 9 and 16-20, respectively. Thus fibers 4-9 and 16-21 are treated as a separate, independent indexing subset from the remaining 12 fibers (fibers 1-3, 10-12, 13-15 and 22-24) of the multi-fiber connector.

Still referring to FIG. 14, the second subset of index fibers includes fibers 1-3, fibers 10-12, fibers 13-15 and fibers 22-24. From this subset, fiber 1 is dropped to a forward spare port and fiber 24 is dropped to a reverse spare port. Fibers 2 and 3 are indexed to positions 1 and 2. Fiber 10 is indexed to position 3. Fibers 11-15 are indexed to positions 10-14. Fiber 22 is indexed to position 15. And fibers 23 and 24 are indexed to positions 22 and 23.

Figure 15:
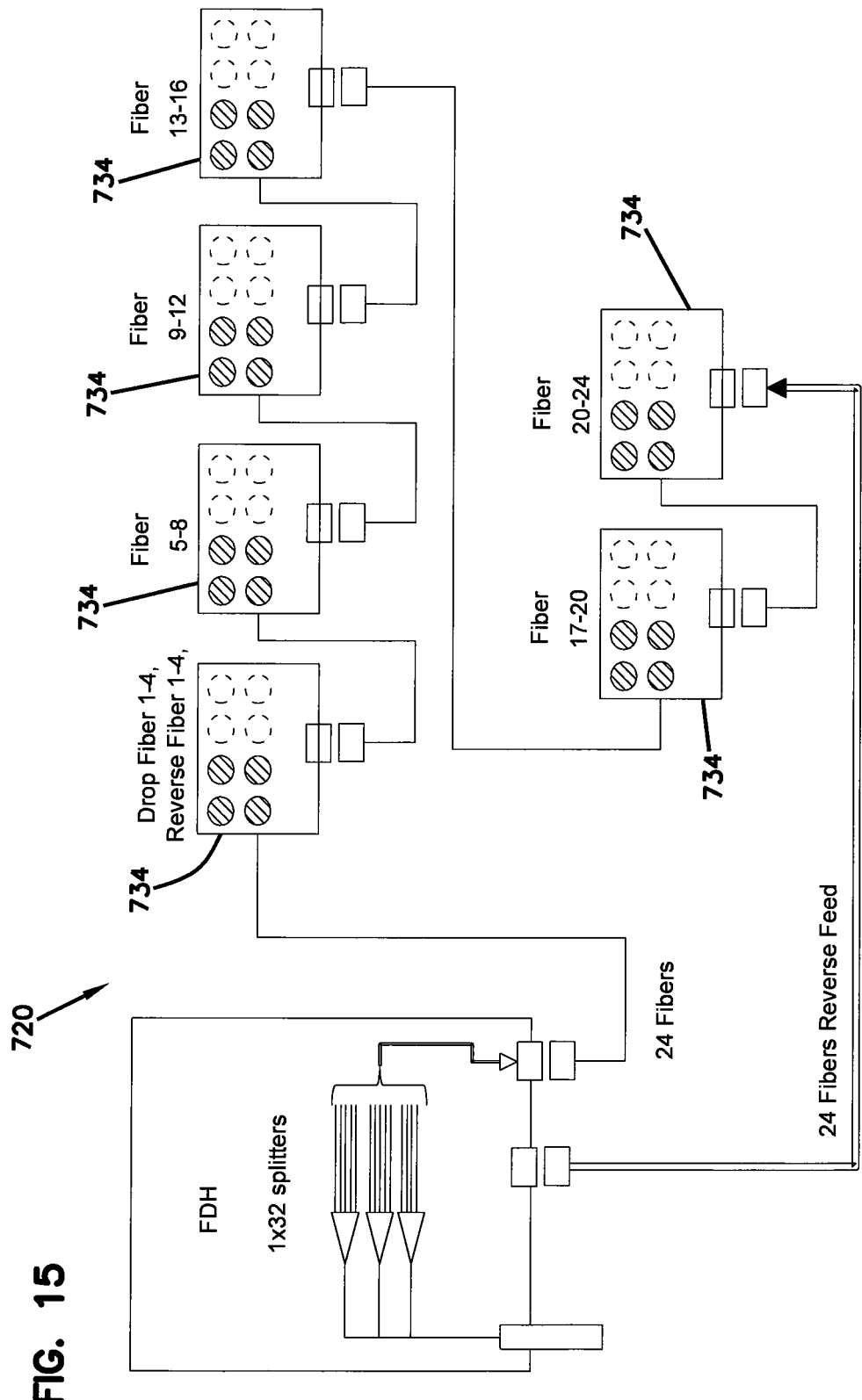
FIG. 15 schematically illustrates a further network architecture in accordance with the principles of the present disclosure, the architecture includes indexing components daisy chained together with 4 fibers being dropped in forward direction and 4 fibers being dropped in a reverse direction at each indexing component.
Figure 16:
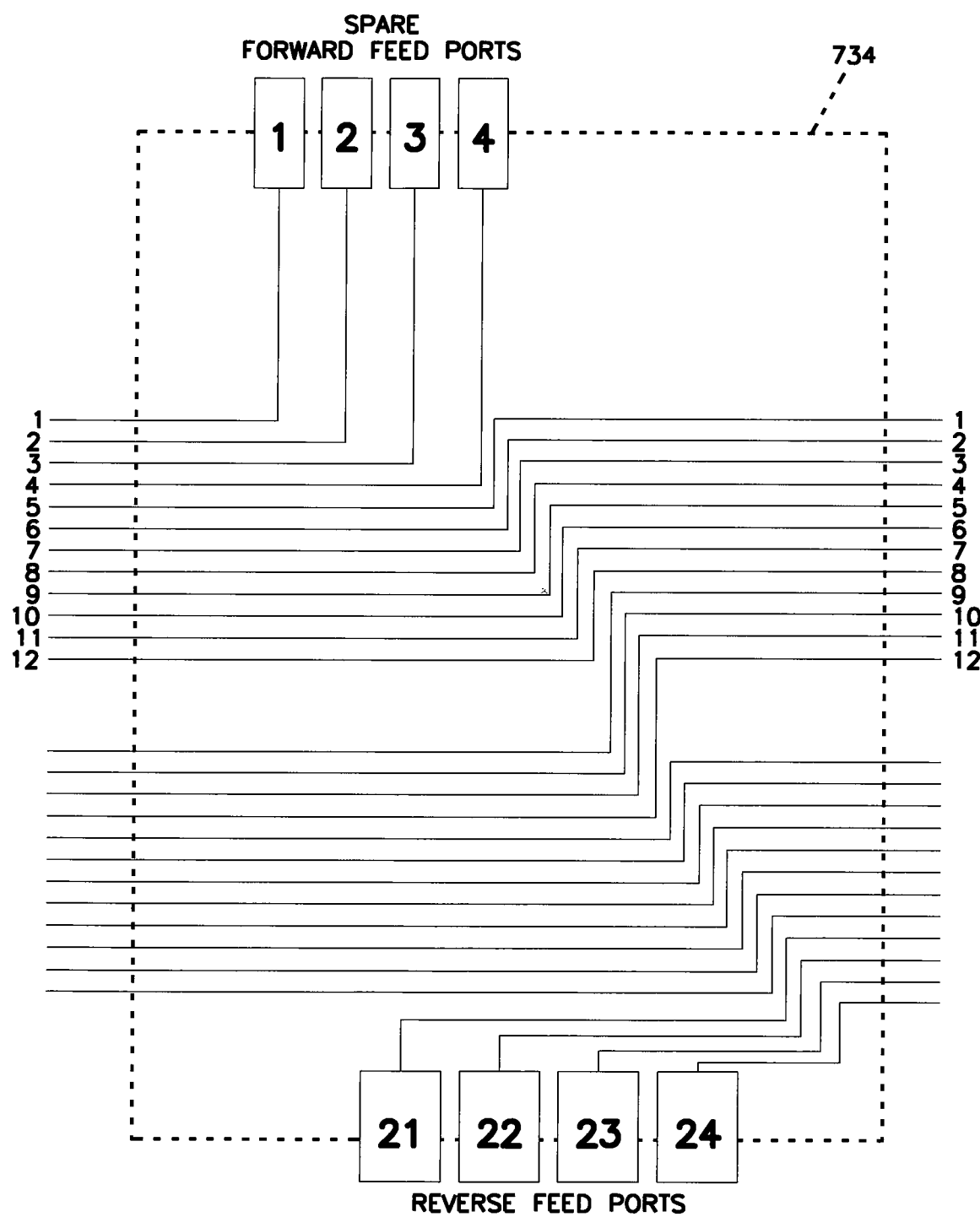
FIG. 16 shows an indexing scheme for the indexing components of the architecture of FIG. 15.

FIGS. 15 and 16 show another architecture 720 utilizing 24-fiber cables and 24-fiber fiber optic connection points. In this architecture, indexing components 734 are used that drop 4 fibers in a forward direction and 4 fibers in a reverse direction at each of the components. For example, as shown in FIG. 16, from a forward to a reverse direction, fibers 1-4 are dropped to ports 1-4. Also, fibers 5-24 are indexed to positions 1-20. Additionally, in a reverse direction positions 21-24 are dropped to ports 21-24.

Figure 17:
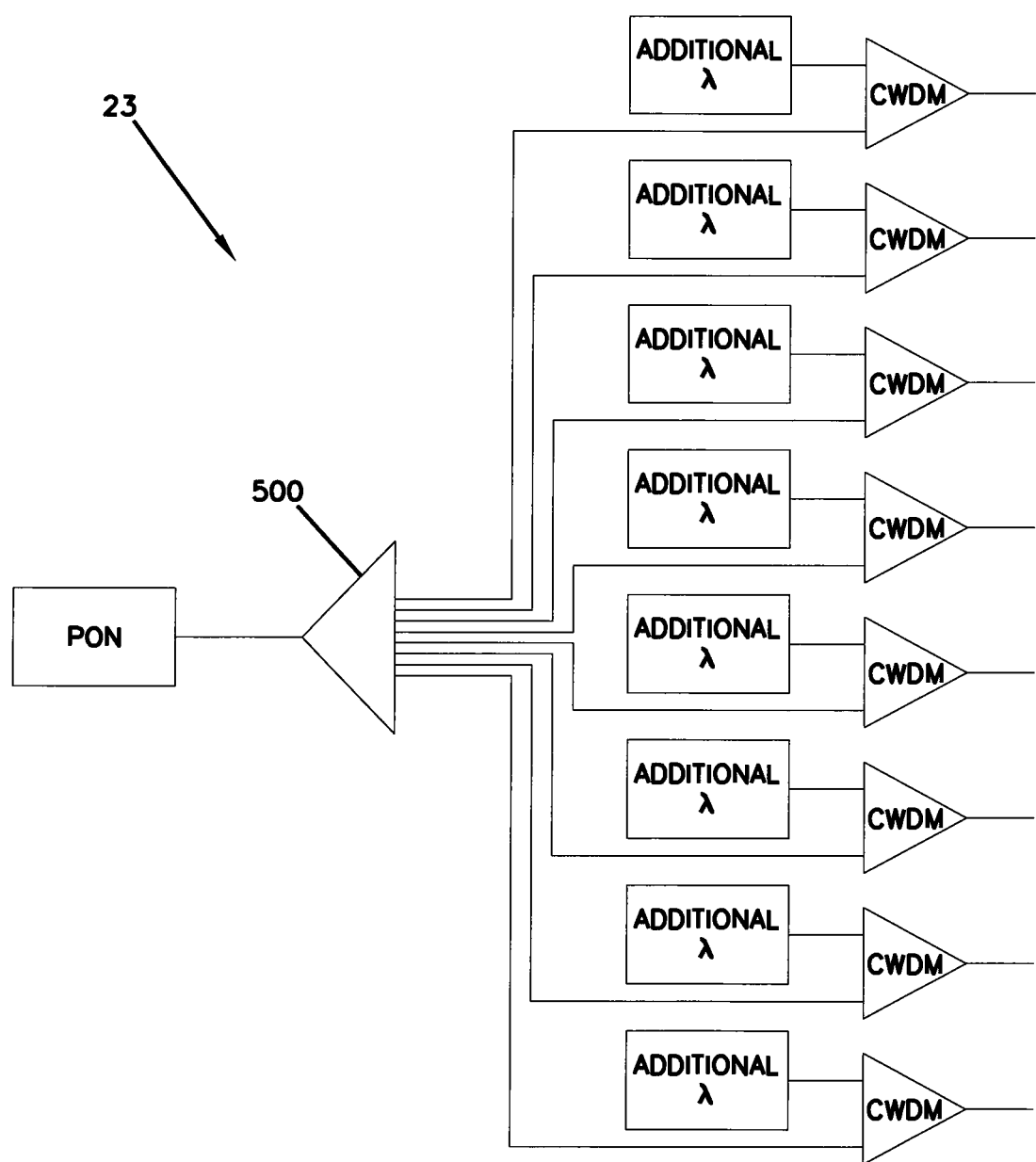
FIG. 17 shows a central office configuration with PON splitting positioned behind locations where extra wavelength signals are overlaid with the PON signals via wavelength division multiplexers.

In certain examples, it is desired to push splitting back to the central office in order to increase the number of fibers from the central office with the capability of providing other services along with PON. In certain examples, video overlay can be eliminated. As shown at FIG. 17, PON service is split prior to merging the PON service with additional wavelengths. For example, an optical splitter 500 is positioned upstream from the wavelength division multiplexers used to merge the PON signals with signals having additional wavelengths. In certain examples, the splitter can include a 1×2 splitter, a 1×4 splitter, a 1×8 splitter, a 1×16 splitter, a 1×32 splitter. Output sides of the CWDMs can be connected to fiber distribution hubs via F1 optical fibers.

Figure 18:
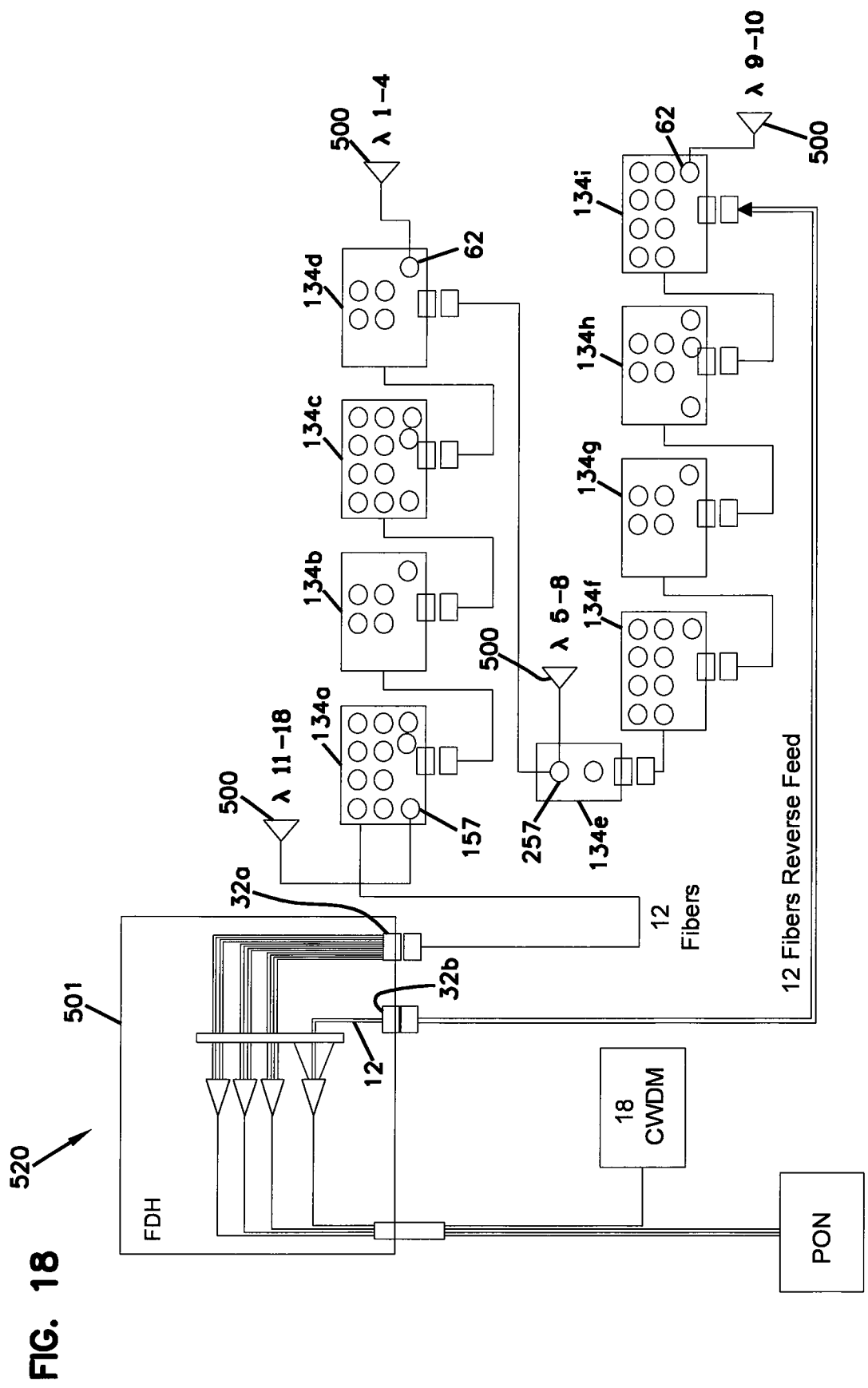
FIG. 18 shows still another architecture in accordance with the principles of the present disclosure where signals with different wavelengths or ranges of wavelength are harvested at or near the indexing components via wavelength division multiplexers.

FIG. 18 shows still another architecture 520 in accordance with the principles of the present disclosure. The architecture uses the same F2 portion as the architecture 120. In the architecture of FIG. 17, the central office provides PON signals and signals carrying 18 CWDM channels on separate F1 fibers to an FDH. In certain examples, passive optical splitter can be used to passively split the 18 CWDM channels at the FDH. Similarly, passive optical splitters can be used to passively split the PON signals at the FDH. As described above with respect to other FDHs, patch panels can be provided within the FDHs to allow for management of the services provided within the F2 portion of the architecture. As described above, through port mapping, ports at the patch panels can be used to connect the PON signals or the 18 CWDM signals to desired ports within the F2 portion of the network. In certain examples, the 18 CWDM signals can be directed to particular reverse-feed ports or spare forward-feed ports provided at the indexing components. In certain examples, wavelength division multiplexers 500 such as CWDMs or DWDMs can be used at or near the indexing components to harvest particular wavelengths from the 18 CWDM channels/signals provided to the sport drop ports or the reverse feed ports so that particular subscribers can be provided with access to particular wavelengths harvested by the wavelength division multiplexers. The indexing components can have the same structures described above with respect to the other architectures.

Figure 19:
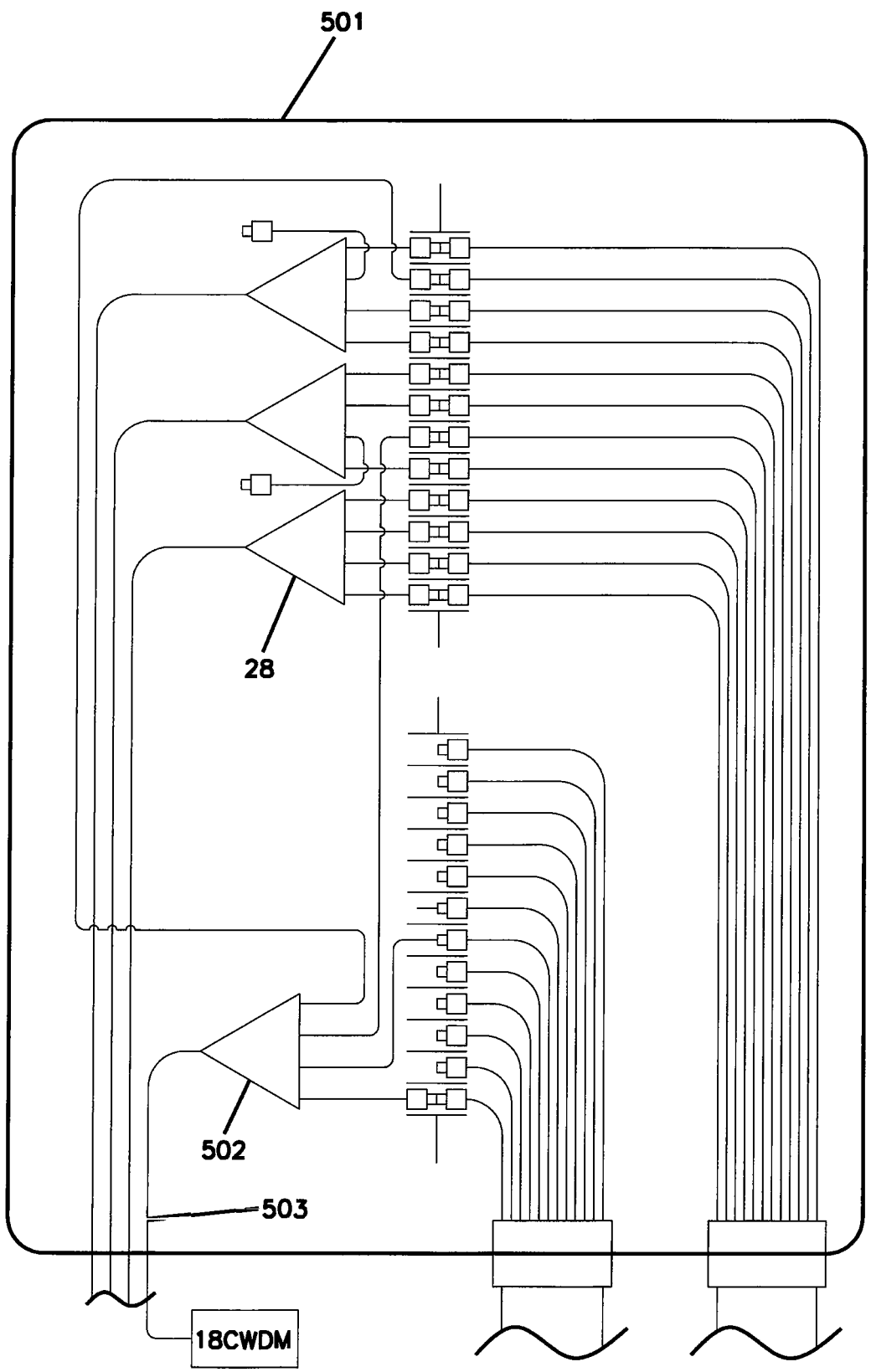
FIG. 19 shows an FDH suitable for use with the architecture of FIG. 18.

FIG. 19 shows an example FDH 501 for the architecture of FIG. 18. The FDH includes an optical power splitter 502 that splits a signal from an F1 fiber 503 carrying 18 CWDM channels. The outputs of the splitter 502 are coupled to patch panel adapter ports corresponding to selected spare ports and reverse feed ports (e.g., port 157 of component 134*a*; port 62 of component 134*d*; port 257 of component 134*e* and port 62 of component 134*i*). By using the harvesting CWDM's 500 to filter the signals routed from the ports to subscribers, each subscriber can be provide with signals having different wavelengths or wavelength bands.

Aspects of the present disclosure relate to architectures that can support multiple uses/services in the field and that incorporate indexing technology. Certain aspects of the present disclosure relate to indexing architectures where multiple indexing terminals are daisy chained together with some optical fibers being dropped at one or more of the terminals and with the remainders of the optical fibers being indexed to different fiber ferrule positions as the optical fibers extend from multi-fiber ferrule to multi-fiber ferrule. It will be appreciated that the multi-fiber ferrules can be provided on tethers of the indexing terminals, on ruggedized multi-fiber fiber optic connectors (e.g., HMFOC's), on non-ruggedized multi-fiber connectors, and at ruggedized multi-fiber connector ports. In certain aspects of the present disclosure, different types of indexing terminals can be daisy chained together. The indexing terminals daisy chained along a single chain can include indexing terminals having different drop rates from one terminal to the next. Certain of the terminals can include both forward and reverse fiber drops.

In certain examples, the fibers dropped at the indexing terminal can be coupled to multi-fiber ferrules or single-fiber ferrules to provide connection locations for allowing the dropped optical fibers to be coupled to drop components (e.g., point-to-point drop cables, passive power splitter drop terminals, WDM drop terminals, etc.). In certain examples, the forward and reverse dropped fibers can be coupled to ruggedized single-fiber ports or to ruggedized multi-fiber ports. In certain examples, the forward and reverse dropped fibers can be coupled to non-ruggedized single-fiber connectors (e.g., LC or SC) or to non-ruggedized multi-fiber connectors (e.g., MPO). In certain examples, the forward and reverse dropped fibers can be coupled to ruggedized single-fiber connectors or to ruggedized multi-fiber connectors. In other examples, the forward dropped fibers can be routed to single-fiber ruggedized ports while the reverse dropped fibers can be routed to at least one ruggedized multi-fiber port or ruggedized multi-fiber connector (e.g., HMFOC connector or HMFOC port).

For a twelve-fiber indexing terminal it will be appreciated that typically at least one, two, three or four optical fibers will be dropped at the indexing terminal while the remainder will be indexed. Generally, it will be preferred for 2-4 optical fibers to be dropped while the remainder of the optical fibers will be indexed. To support a multi-use access network, a relatively large number of the feeder fibers directed to the fiber distribution hub will be dedicated for pass-through applications such as direct drops, special services, distributed antenna support, or other applications. In certain examples, at least 40%, or at least 50%, or at least 60%, or at least 70%, or at least 80% of the total feeder fibers provided to the fiber distribution hub will be dedicated to and used for pass-through applications. The remainder of the feeder fibers may be passively split at the fiber distribution hub.

Aspects of the present disclosure relate to a multi-use access network designed such that one network can serve a large number of uses. Example uses include residential PON services, fiber to the distribution point, fiber to the antenna, fiber to the small cell, metro Ethernet, or other applications. It is desirable for the network to be relatively simple, flexible, scalable and efficient. In certain examples, the multi-use access network can have a feeder network that is easily upgradeable, a distribution network that is designed to enhance flexibility and a drop network capable of providing a large number of drops for supporting many different services.

For twenty-four fiber indexing terminals it will be appreciated that larger numbers of optical fibers will likely be dropped. For example, for a twenty-four fiber indexing terminal two to eight fibers may be dropped while the remainder are indexed from multi-fiber ferrule to multi-fiber ferrule. In certain twenty-four fiber indexing terminals at least four, or at least five, or at least six, or at least seven, or at least eight optical fibers may be dropped in one direction at the indexing terminal while the remainder of the optical fibers are indexed from one multi-fiber ferrule to another. As used herein, "dropped in one direction" means dropped in a forward direction or dropped in a rearward direction. In a typical 12-fiber indexing terminal, 2-4 fibers can be dropped in a forward direction and 2-4 fibers can be dropped in a rearward direction. In certain 12-fiber indexing terminals, at least two, or at least three, or at least four optical fibers can be dropped in a forward direction and at least two, or at least three, or at least four optical fibers can be dropped in a rearward direction. In one example, the optical fibers dropped in the forward direction are routed to single-fiber connection locations (e.g., single-fiber ferrules, single-fiber ruggedized connector ports, singe-fiber connectors, single-fiber ruggedized connectors) and the optical fibers dropped in the reverse direction are routed to a multi-fiber connection location (e.g., a multi-ferrule, a ruggedized multi-fiber connector port, a ruggedized multi-fiber connector, a non-ruggedized fiber optic connector, etc.).

The optical fibers dropped in a forward direction can be routed to a splice location, a single fiber ferrule, a multi-fiber ferrule, a ruggedized single fiber connector, a ruggedized multi-fiber connectors, a non-ruggedized single fiber connector, a non-ruggedized multi-fiber connector, a ruggedized single fiber connector port or a ruggedized multi-fiber connector port. Similarly, the optical fibers dropped in the reverse direction can be routed to a splice location, to single fiber ferrules, to multi-fiber ferrules, to ruggedized single fiber connectors, to ruggedized multi-fiber connectors, to non-ruggedized single fiber connectors, to non-ruggedized multi-fiber connectors, to ruggedized single fiber ports or to ruggedized multi-fiber ports.

Figure 20:
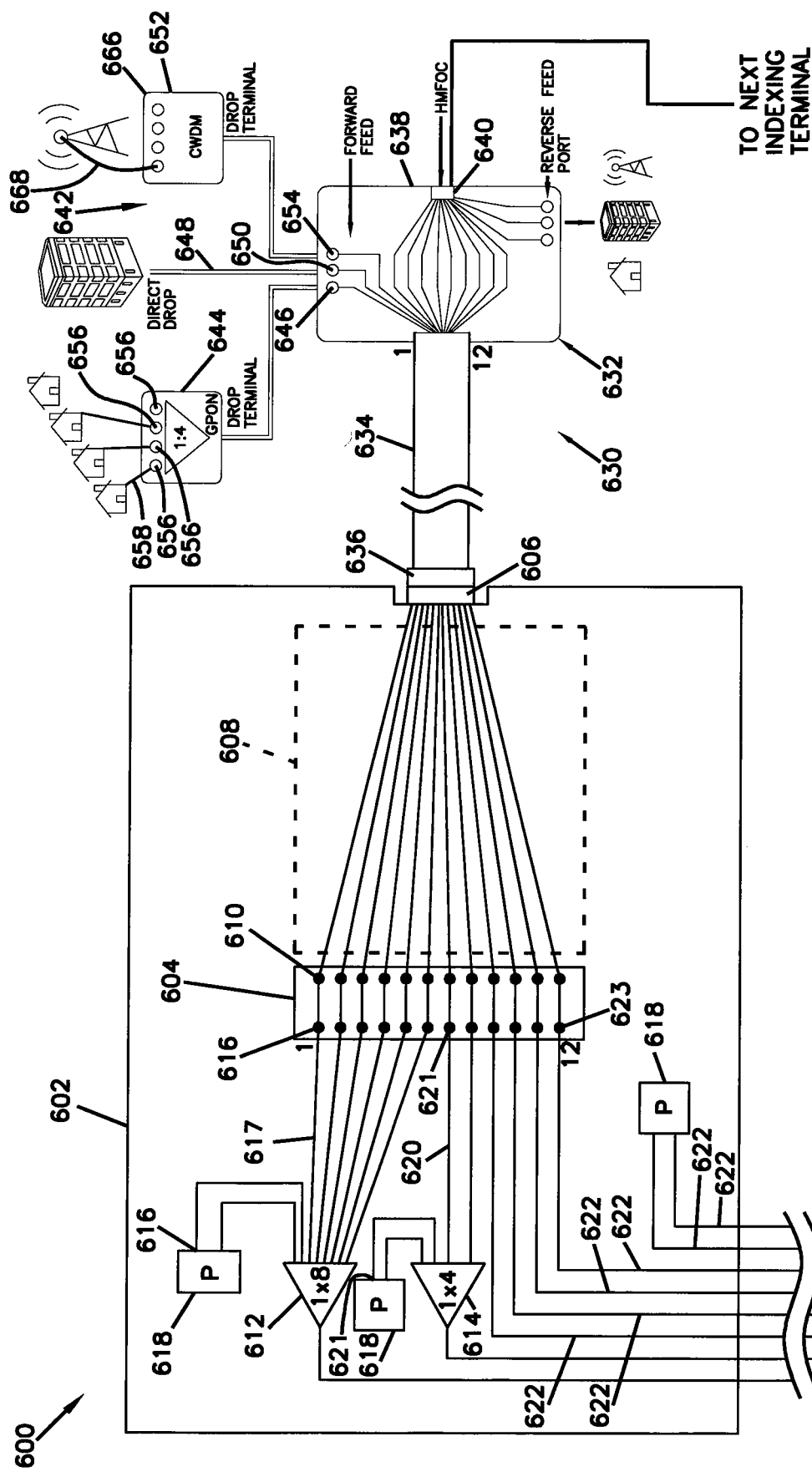
FIG. 20 schematically illustrates another network architecture in accordance with the principles of the present disclosure for supporting a multi-use access network having fiber indexing.

FIG. 20 shows an architecture 600 in accordance with the principles of the present disclosure for supporting multiple applications. The architecture 600 includes a drop terminal 602 having a patch panel 604. The patch panel 604 can include a plurality of fiber optic adapters as previously described herein. One side of the patch panel 604 can be optically coupled to a multi-fiber ferrule 606 that may be incorporated within a ruggedized port accessible from outside the cabinet of the fiber distribution hub 602. The optical connection between the patch panel 604 and the ruggedized port can be provided by a module 608 having single fiber connectors 610 at one end and the multi-fiber ferrule 606 at an opposite end. Optical fibers can be routed through a module housing to optically connect the single-fiber optical connectors 610 to the multi-fiber ferrule 606. The single-fiber connectors 610 can be inserted into ports of adapters provided at the patch panel 604.

The fiber distribution hub 602 also includes passive optical power splitters and may further include wavelength division multiplexers. In certain examples, passive optical power splitters having different split ratios can be provided within the cabinet of the fiber distribution hub 602 at the same time. As depicted, the passive optical power splitters can include a 1:8 splitter and a 1:4 splitter. For ease of illustration, only two splitters are shown. In actual practice, a large number of splitters may be provided within the cabinet of the FDH 602. Additionally, while only 1:4 and 1:8 splitters have been shown, splitters having other split ratios could also be included within the fiber distribution hub 602 along with the 1:4 splitters and the 1:8 splitters. For example, the fiber distribution hub 602 could also include 1:16 splitters, 1:32 splitters, and 1:64 splitters.

The splitter 612 includes eight output pigtails 617 that each preferably have a connectorized end 616. Six of the connectorized pigtails are shown plugged into ports of adapters at the patch panel 604. The other connectorized pigtails are shown stored at a parking location 618.

The splitter 614 includes four output pigtails 620 having connectorized ends 621. Two of the pigtails 620 are stored at parking 618 while the other two pigtails 620 are plugged into adapter ports at the patch panel 604.

A plurality of pass-through fibers 622 are also shown routed into the cabinet of the fiber distribution hub 602. The pass-through fiber 622 can have connectorized ends 623. Some of the pass-through fibers 622 are plugged into adapter ports at the patch panel 604 while the remainder are stored at parking 618. In certain examples of the present disclosure, at least 30%, or at least 40%, or at least 50%, or at least 60%, or at least 70%, or at least 80%, or at least 90% of the total number of feeder fibers managed by the fiber distribution hub 602 are pass-through fibers. The large percentage of pass-through fibers allows the fiber distribution hub 602 to readily support a variety of services and applications that may require direct point-to-point drop service.

Still referring to FIG. 20, the architecture 600 includes a distribution network 630 that may include one or more chains of indexing terminals 632. The indexing terminal 632 includes a tether 634 containing plurality of fibers (e.g., a 12-fiber ribbon). A multi-fiber connector 636 (e.g., an HMFOC connector) is mounted at a free end of the tether. At the terminal 632, three optical fibers are dropped in the forward direction and three optical fibers are dropped in the reverse direction. The optical fibers can be routed to drop ports provided on a housing of the terminal 632. In certain examples, the drop ports can be ruggedized. In certain examples, the drop ports can support single fiber or multi-fiber connectivity. The optical fibers not dropped in a forward direction are indexed in position from the multi fiber ferule of the ruggedized connector 636 to another multi-fiber ferrule provided at a ruggedized port 640 (e.g., an HMFOC port) provided on the housing of the terminal 632. The ruggedized port 640 provides a means for coupling the terminal 632 to subsequent indexing terminal so as to form a daisy chain that extends the distribution network.

Referring still to FIG. 20, the indexing terminal 632 is configured to support a variety of services. Such support is provided by coupling a drop network 642 to the indexing terminal 632 via the drop ports. As depicted, the drop network includes a GPON drop terminal 644 coupled to port 646 of the forward feed drop ports, a point-to-point drop line 648 routed from port 650 of the forward feed ports to a multi-dwelling unit or business, and a WDM drop terminal 652 coupled to port 654 of the forward feed ports. The GPON drop terminal 644 is configured to support residential PON services. In certain examples, the GPON drop terminal 644 can be configured to split the optical signal received from the indexing terminal to a plurality of PON drop ports which can be ruggedized single-fiber drop ports. Drop lines 658 can be routed from the drop ports 656 to the residences. The WDM drop terminal 652 can be used to support fiber to the antenna applications such as distributed antenna systems.

Figure 31:
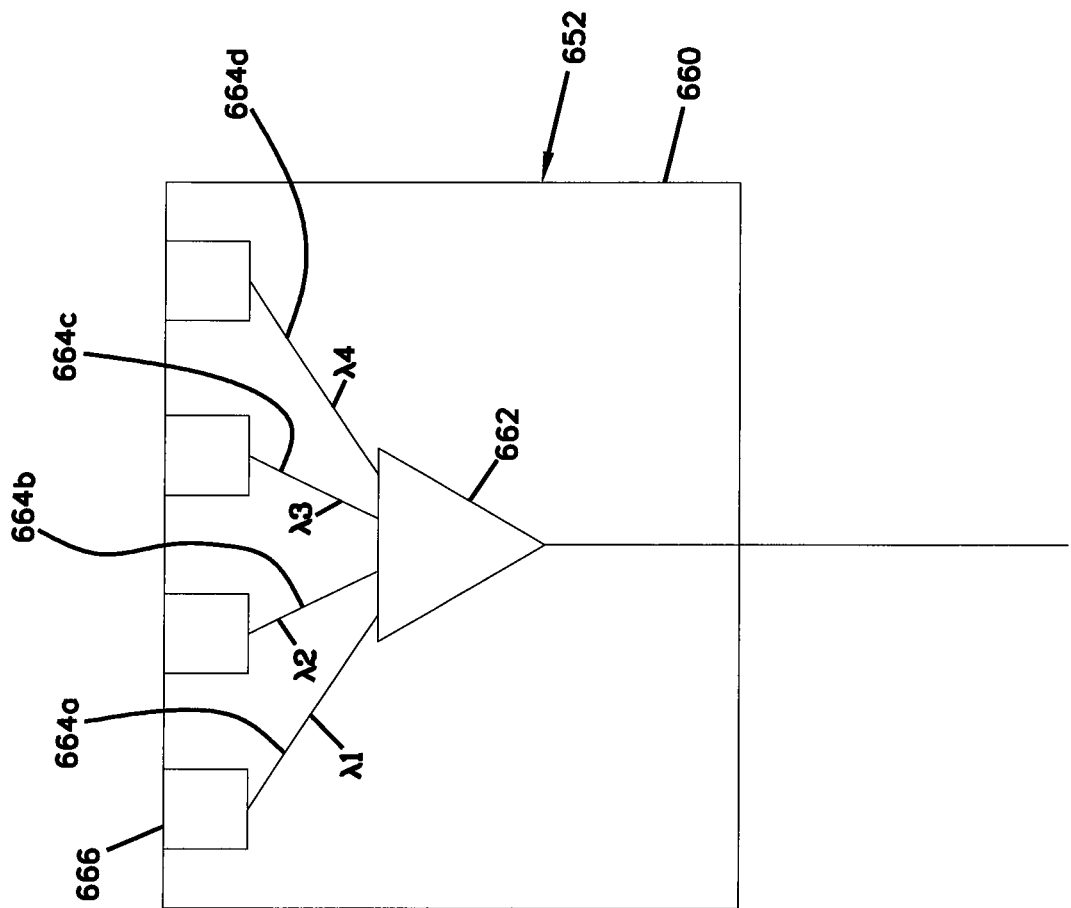
FIG. 31 is a schematic depiction of an example WDM drop terminal.

FIG. 31 is a schematic view of the WDM drop terminal 652. The WDM drop terminal 652 includes a housing 660 containing a wavelength division multiplexer 662 (e.g., a DWDM or a CWDM). The wavelength division multiplexer 662 splits the optical signal received from the drop port 654 into a plurality of outputs 664a-664d each having a different wavelength or range of wavelengths. The outputs 664a-664d extend from the wavelength division multiplexer 662 to separate drop ports 666. Drop lines 668 can be used to optically couple the port 666 to a radio head or other structure on the antenna.

It will be appreciated that providing optical splitters having different split ratios within the fiber distribution hub 602 allows the fiber distribution hub 602 to support drop terminals having different split ratios at the outer edge of the network architecture. In one example, it may be desirable to provide a one by thirty-two split ratio. Thus, the passive optical splitter 612 (i.e., the 1:8 splitter) is shown coupled to the GPON drop terminal 644 which has a 1:4 split ratio. Thus, the total split ratio including both splitters is 1:32. If a downstream application requires a drop terminal with a 1:8 split ratio, such a drop terminal can be coupled to the optical splitter 614 having the 1:4 split ratio. Additionally, as the neighborhood grows, it may be desirable to switch the 1:4 GPON drop terminal 644 with a 1:8 drop terminal. If this replacement occurs, to maintain the 1:32 split ratio, the 1:8 splitter 612 can be disconnected from port 1 of the patch panel 604 and one of the output pigtails of the 1:4 splitter 614 can be plugged into the port 1. The unused output from the 1:8 splitters 612 can be stored in parking 618. Similarly, certain services assigned to certain drop ports of the indexing terminal 632 may change over time and require different services or split ratios. When this occurs, the service changes can be managed at the patch panel 604.

In certain applications, intelligence can be incorporated into all phases of the network to assist in network management. For example, sensors, RFID chips, or other identifiers can be associated with each of the different drop components of the drop network. When a given drop component is plugged into a drop port of the indexing terminal 632, the indexing terminal can recognize the type of component or connected and can forward this information to a central controller that also interfaces with the fiber distribution hub 602. Communication between the central controller, the terminal 632 and the distribution hub 602 can be wireless or wired. The fiber distribution hub 602 can also include intelligence at the panel 604 that senses the type of equipment plugged into each of the ports. This information is relayed back to the central controller. The central controller can include management software that manages the data to ensure that each drop component is optically connected to a compatible signal source at the fiber distribution hub. If there is an inconsistency between the drop terminal and the signal source at the fiber distribution hub, an alert can be generated. The alert may generate a work order for a technician to visit the fiber distribution hub and make the change. In certain examples, the patch panel may have indicators (e.g., indicator lights) that assist the technician in identifying necessary modifications.

In other systems, a field technician can use a smart device such as a tablet or phone to read a barcode, or RFID tag or other identifier on each of the drop components being installed. Via the smart device, the technician can associate each of the drop components to a corresponding port on the terminal 632. Once the technician has collected this information, the information can be sent to a central controller which records and manages the data. Similar data relating to the type of input signals provided to each signal line can be collected from the FDH in a similar manner and provided to the central controller.

Figure 21:
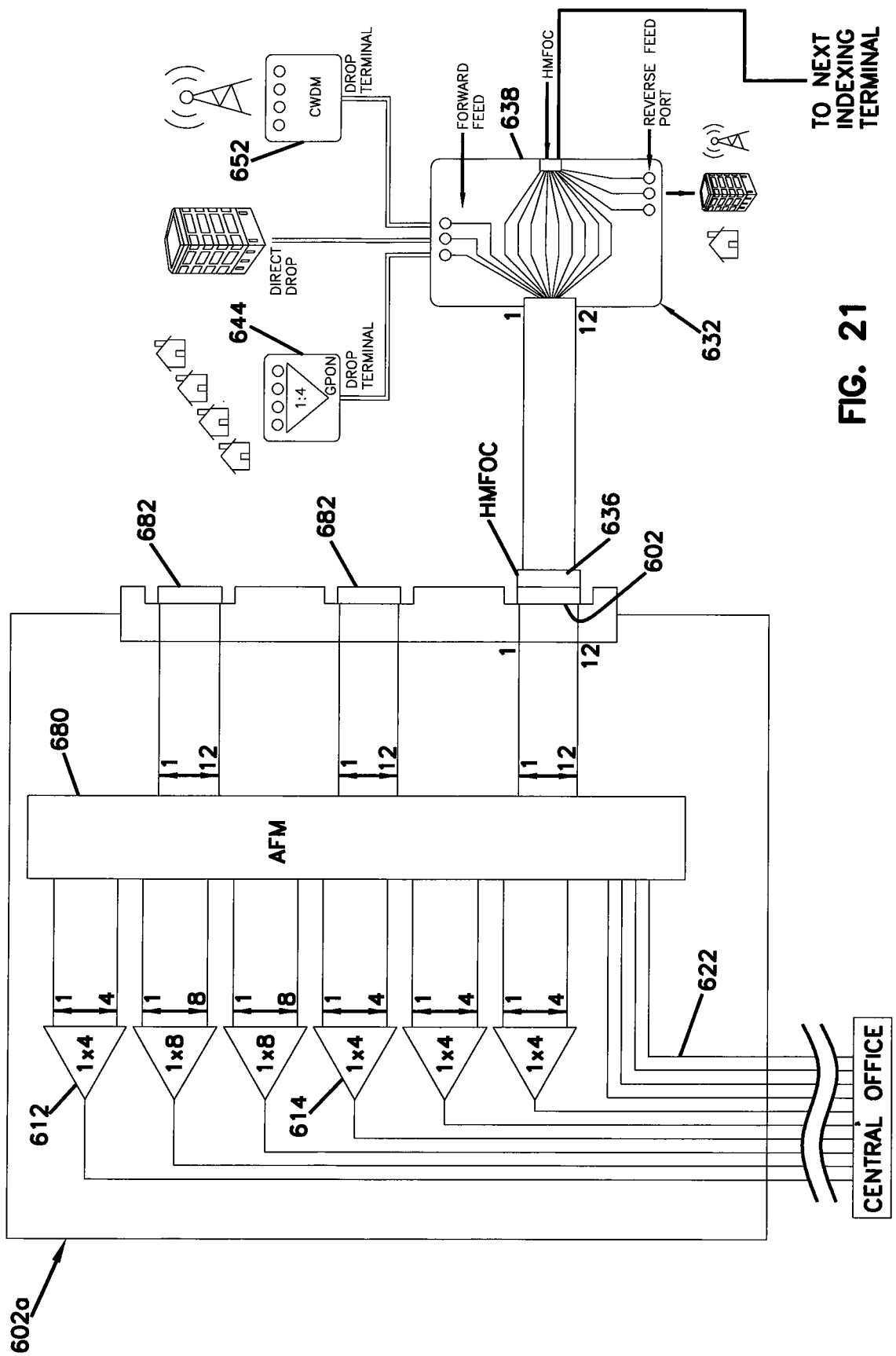
FIG. 21 illustrates still another network architecture in accordance with the principles of the present disclosure for supporting a multi-use access network having fiber indexing.

FIG. 21 shows an alternative fiber distribution hub 602a used to support the same architecture described with respect to FIG. 20. In the fiber distribution hub 602a, the 1:8 splitter 612, the 1:4 splitter 614 and the pass-through fibers 622 all interface with an automatic fiber management system 680 of the type described at U.S. Pat. No. 8,755,688, which is hereby incorporated by reference in its entirety. The automatic fiber management system 680 automatically connects certain outputs of the splitters 612, the splitter 614 or the pass-through fiber 622 to certain fiber positions in multi-fiber ferrules 682 provided at a multi-fiber ferrule output location. In using an intelligent system of the type described above, the AMF 680 automatically connects the appropriate signal source to the appropriate port/fiber position based on the type of drop component coupled to the indexing terminal 632. Similarly, in the event a drop component is changed in the field, this change can be recognized and the ATM 680 can automatically switch the input source to one compatible with the new drop component.

Figure 22:
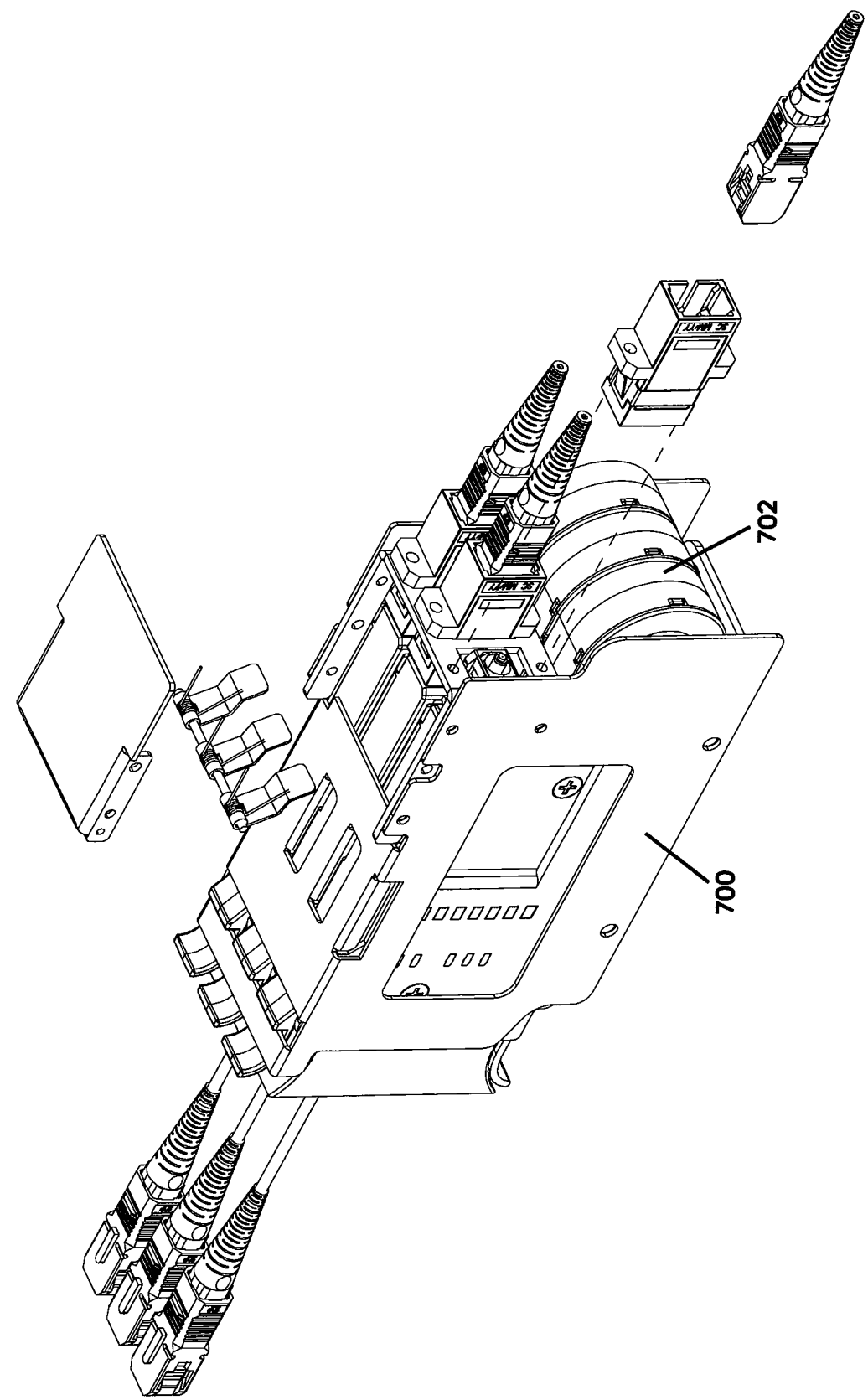
FIG. 22 illustrates a splitter mounting chassis adapted to be mounted within fiber distribution hubs used in network architectures in accordance with the principles of the present disclosure.
Figure 23:
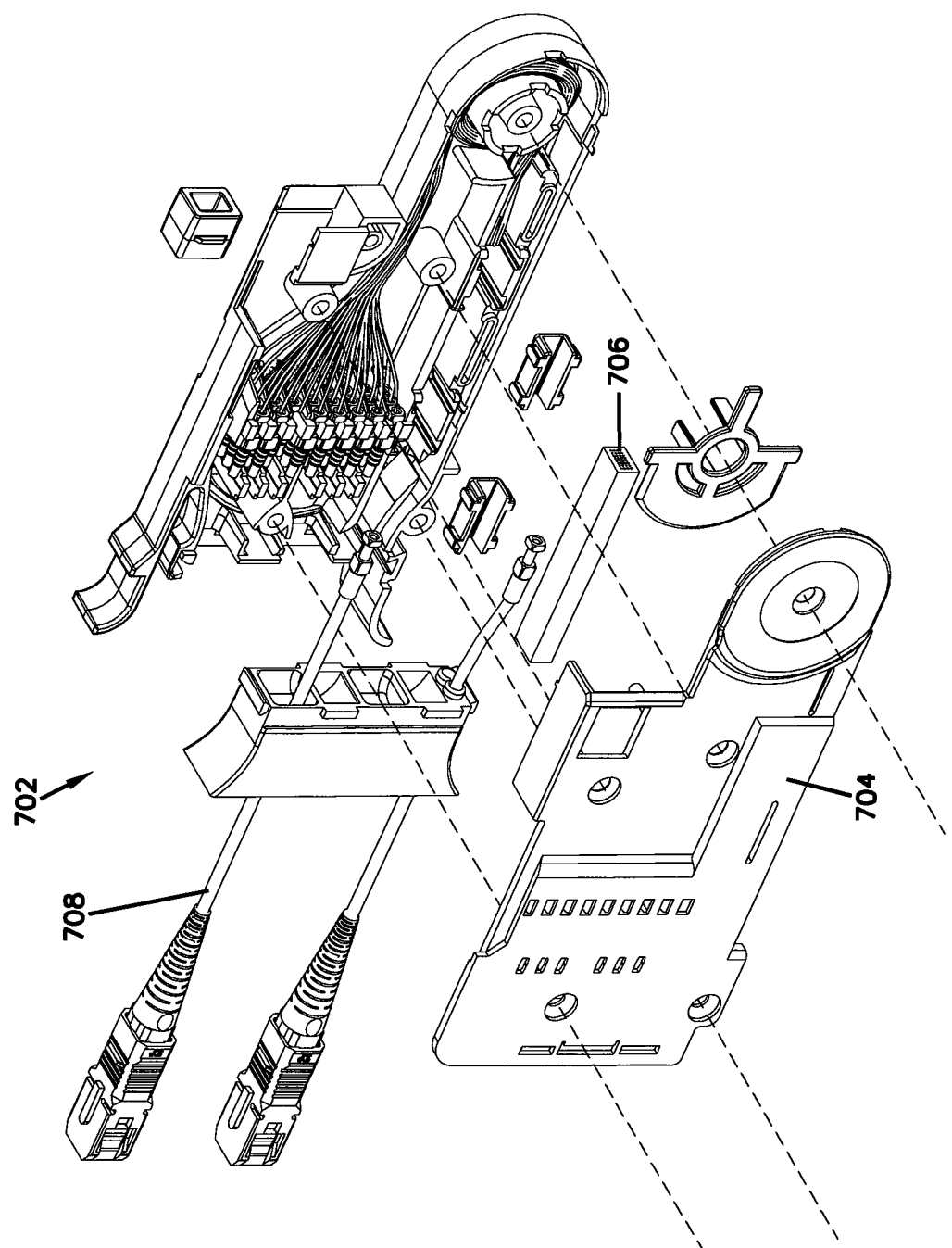
FIG. 23 illustrates a splitter module adapted to mount within the splitter chassis of FIG. 22.

For fiber distribution hubs in accordance with the principles of the present disclosure, it is desirable to provide a high density of connections per volume of the cabinet of the fiber distribution hub. To assist in enhancing fiber density, splitters (e.g., splitters 612 and 614) can be mounted in protective modules that are densely loaded within a splitter chassis can be mounted within the FDH. In this way, splitters are protected and occupy a minimum amount of space. An example of this type of configuration is shown at FIG. 22. Specifically, FIG. 22 shows a splitter chassis 700 that hold a plurality of splitter modules 702. As shown at FIG. 23, each of the modules 702 includes a housing 704 enclosing a passive optical splitter 706. The splitter module 702 includes a plurality of connectorized pigtails 708 optically coupled to the output side of the splitter 706. Further details about the splitter module 702 and the chassis 700 are disclosed in U.S. Pat. No. 9,239,442, which is hereby incorporated by reference in its entirety.

For many applications, the chassis 700 is only partially filled with optical splitter modules 702. Thus, the chassis 700 defines excess space that can be used for other applications. As indicated above, multi-use access networks in accordance with the principles of the present disclosure generate an increased need for pass-through fibers. Thus, there is a need to efficiently add a relatively large number of feeder fibers to an FDH without greatly impacting the overall fiber density of the FDH. In this regard, it is possible to integrate a fan-out device into a module that is compatible with the splitter chassis 700. Thus, the fan-out module is installed in the splitter chassis along with splitter modules and occupies space that would otherwise be empty. In certain examples, the fan-out can include at least sixteen fibers, at least thirty-two fibers, or at least sixty-four fibers.

Figure 24:
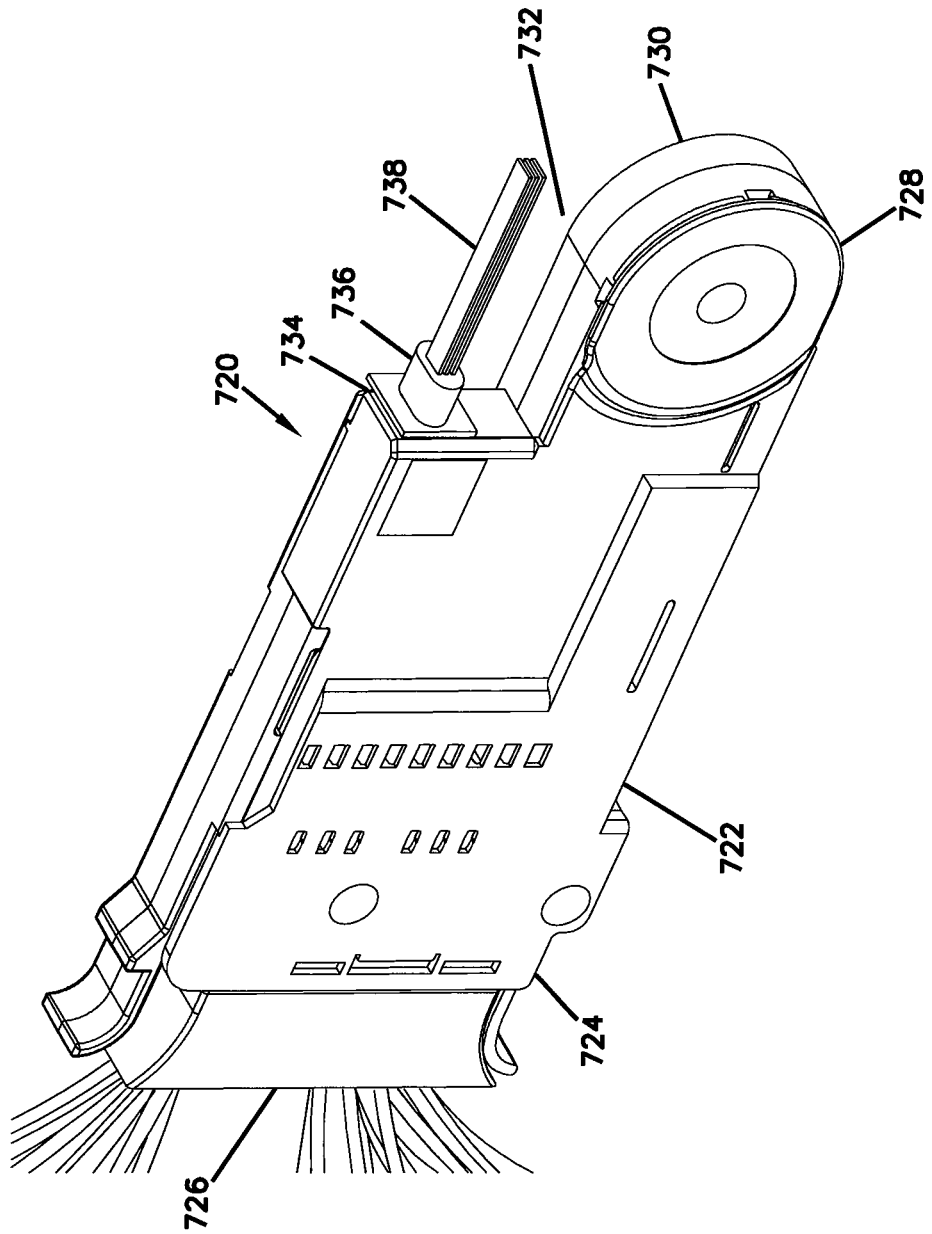
FIG. 24 illustrates a fan-out module adapted to fit within the splitter chassis of FIG. 22.

FIG. 24 illustrates an example fan-out module 720 adapted to fit within the chassis 700. The fan-out module can include a module housing 722 having the same overall shape as the housing 704 of the splitter module 702. The housing can include a first end 724 having a tapered boot 726 and a second end 728 formed by a rounded projection 730. A notch 732 is defined by the projection 730 and an upward wall 734. The upward wall includes a pass-through fitting 736 that allows a plurality of optical fiber ribbons 738 to enter the module housing 722. The fiber ribbons 738 each including a plurality of feeder fibers optically connected to the central office or other central location. The ribbons 738 enter the fan-out housing 722 and are fanned out into individual fibers. The separated fibers (i.e., the fanned-out fibers) are directed into up-jacketing structures (e.g., cable jackets or buffer tubes) and are directed out of the module housing 722 through the boot 726. The up jacketed fibers exiting the housing 722 form pigtails that can be connectorized by single-fiber connectors. In addition to up-jacketing, the pigtails can include strength members such as Kevlar. The strength members can be anchored to anchoring structures within the module housing 722. It will be appreciated that the up jacketing and anchoring can be the same as disclosed in U.S. Pat. No. 9,239,442. In the depicted example, the fan-out module is a 32-fiber fan-out.

Figure 25:
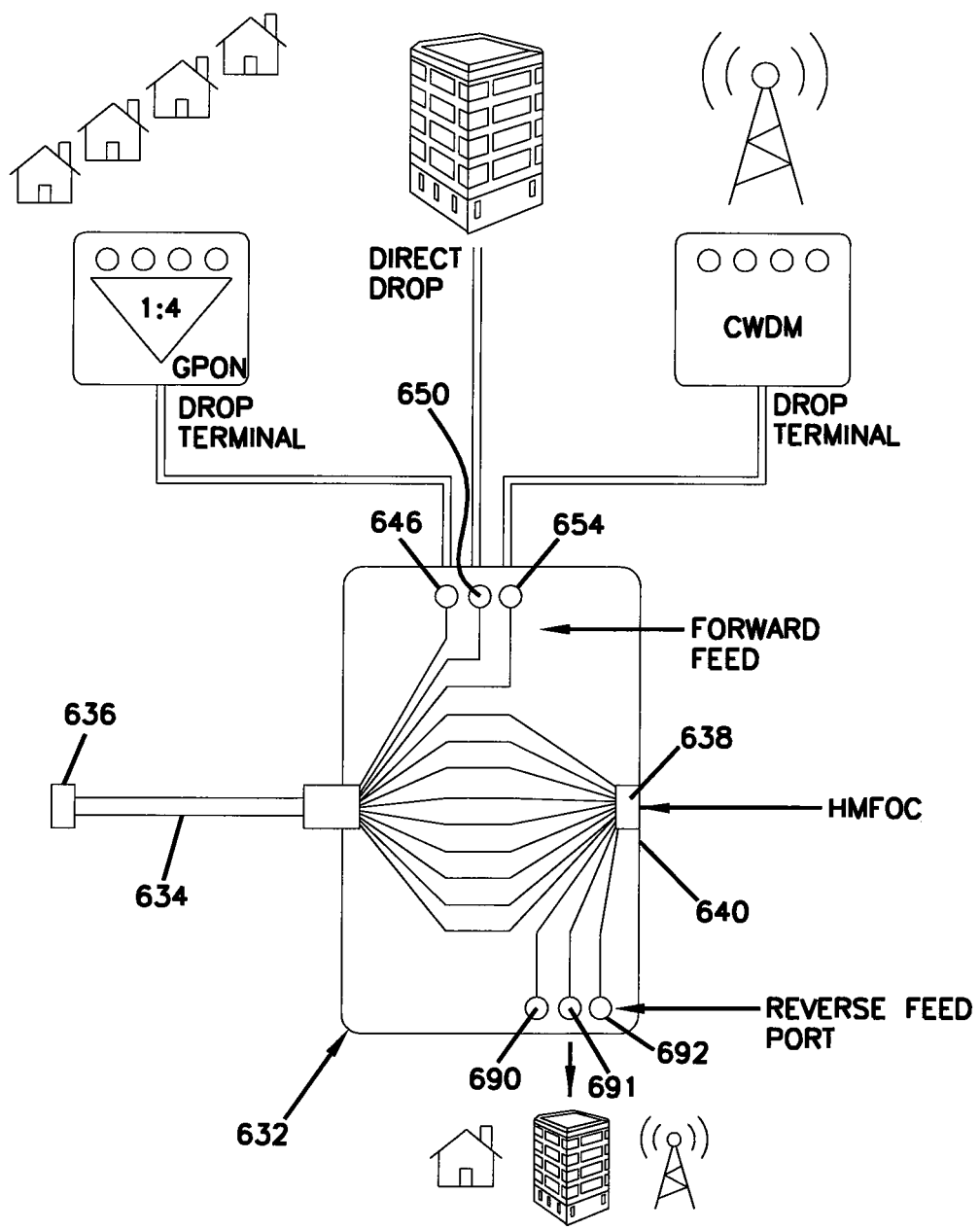
FIG. 25 illustrates an example configuration for an indexing terminal for use in supporting multi-use access networks.

FIG. 25 is another view of the indexing terminal 632 described with respect to FIGS. 20 and 21. As indicated above, the indexing terminal 632 has forward feed ports 646, 650 and 654 that provide access locations for supporting a variety of services. The terminal 632 also includes three reverse feed ports 690, 691 and 692.

Figure 26:
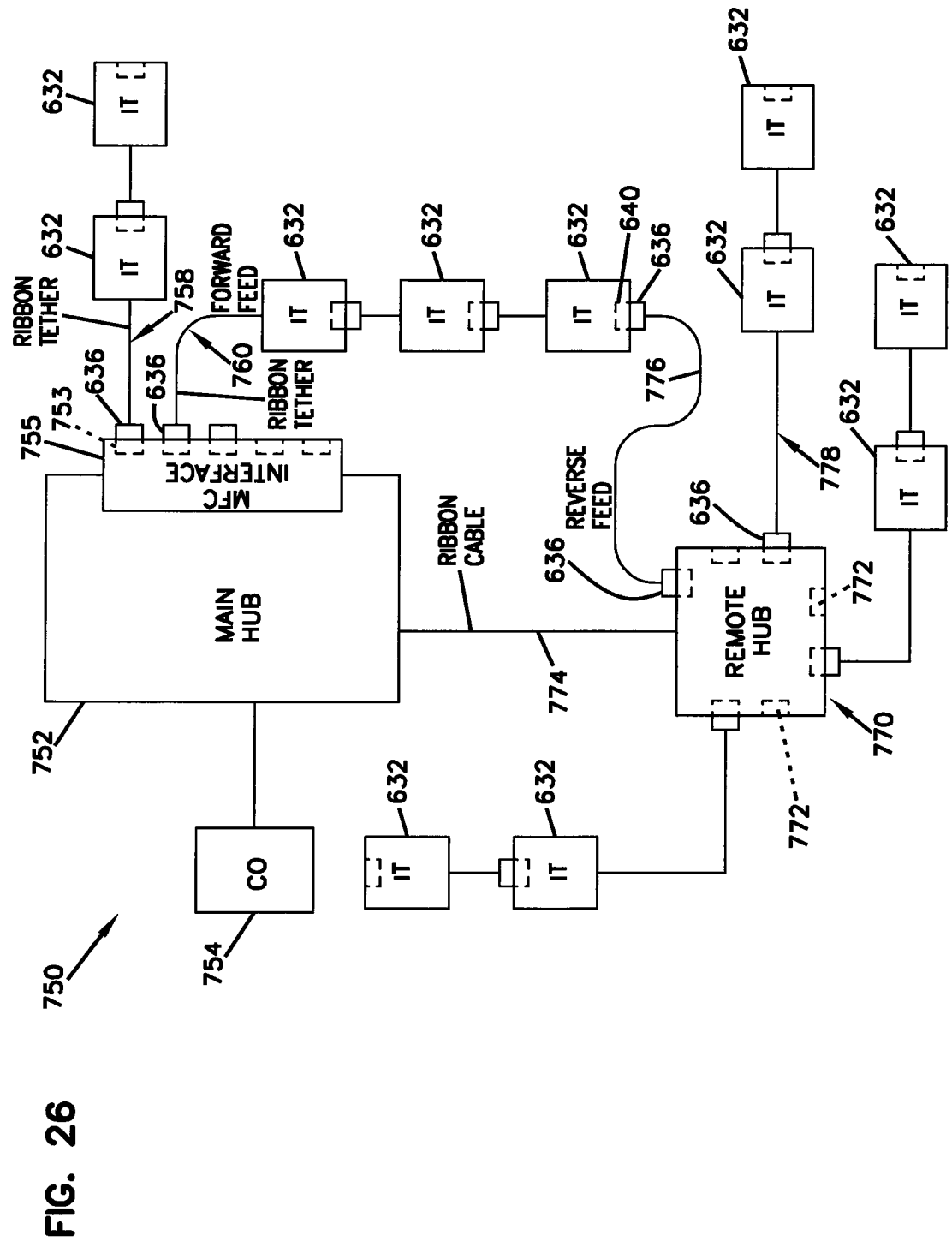
FIG. 26 illustrates still another network architecture utilizing fiber indexing terminals.

FIG. 26 shows another network architecture 750 in accordance with the principles of the present disclosure. The network architecture 750 includes a fiber distribution hub 752 which can include structure of the type previously described herein. The hub 752 interfaces with a central office 754 or other more central location. The hub 752 can include a multi-fiber ferrule interface location that may include outside accessible, ruggedized multi-fiber ports 753 adapted for mating with ruggedized-fiber connectors (e.g., connector 636). The architecture 750 also includes a plurality of chains of the indexing terminals 632. The indexing terminals 632 form first and second forward feeds 758, 760 that are coupled directly to the main hub 752 at the interface 755. The architecture 750 also includes a remote hub 770. The remote hub 770 includes a plurality of multi-fiber ferrule connection locations 772. In a preferred example, multi-fiber ferrule connection locations include ruggedized multi-fiber ferrule ports adapted for receiving ruggedized multi-fiber connectors. A multi-fiber cable 774 extends directly from the main hub 752 to the remote hub 770. The fibers of the cable 774 can be coupled to feeder fibers from the central office 754 at the main hub 752. Such optical connections can be made by optical splices, single-fiber connectorized connections, multi-fiber connectorized connections, or ruggedized multi-fiber connectorized connections.

The remote hub provides a remote or satellite location for providing reverse feed to at least one of daisy chains of indexing terminals 632. For example, a patch cord 776 is shown providing reverse feed to the daisy chain 760. The patch cord 776 has ruggedized multi-fiber connectors 636 at each end. One of the connectors 636 is optically coupled to one of the ports 772. The other connector 636 is coupled to the ruggedized port 640 of the last indexing terminal 632 of the chain. Use of a remote hub allows reverse feed to be provided to a daisy chain of indexing terminals without requiring the daisy chain of indexing terminal to itself loop all the way back to the main hub 752. Additionally, it is also possible to forward feed one, two or more daisy chains of indexing terminals 632 from the remote hub 770. For example, chain 778 is forward fed from the remote hub 770. All of the optical fibers of the architecture either passed through or split at the main hub location before being directed to the remote hub or out on a forward feed of daisy chained indexing terminals. The remote hub allows multiple chains to extend out from one common point that is remote from the main hub.

It will be appreciated that the remote hub 770 can have a variety of configurations. In certain examples, the hub can include a relatively rigid plastic housing on which one or more ruggedized multi-fiber ports are provided (e.g., molded in). In other examples, ruggedized multi-fiber ports or ruggedized multi-fiber connectors can be provided on tethers that branch out from a main cable at one end of the cable or at both ends of the cable. In still other examples, the remote hub can include a sealed closure in which cables are routed into the closure through sealing units and optical connections of various types (e.g., splices, non-ruggedized connectorized connections, etc.) can be made inside the sealed enclosure.

Figure 27:
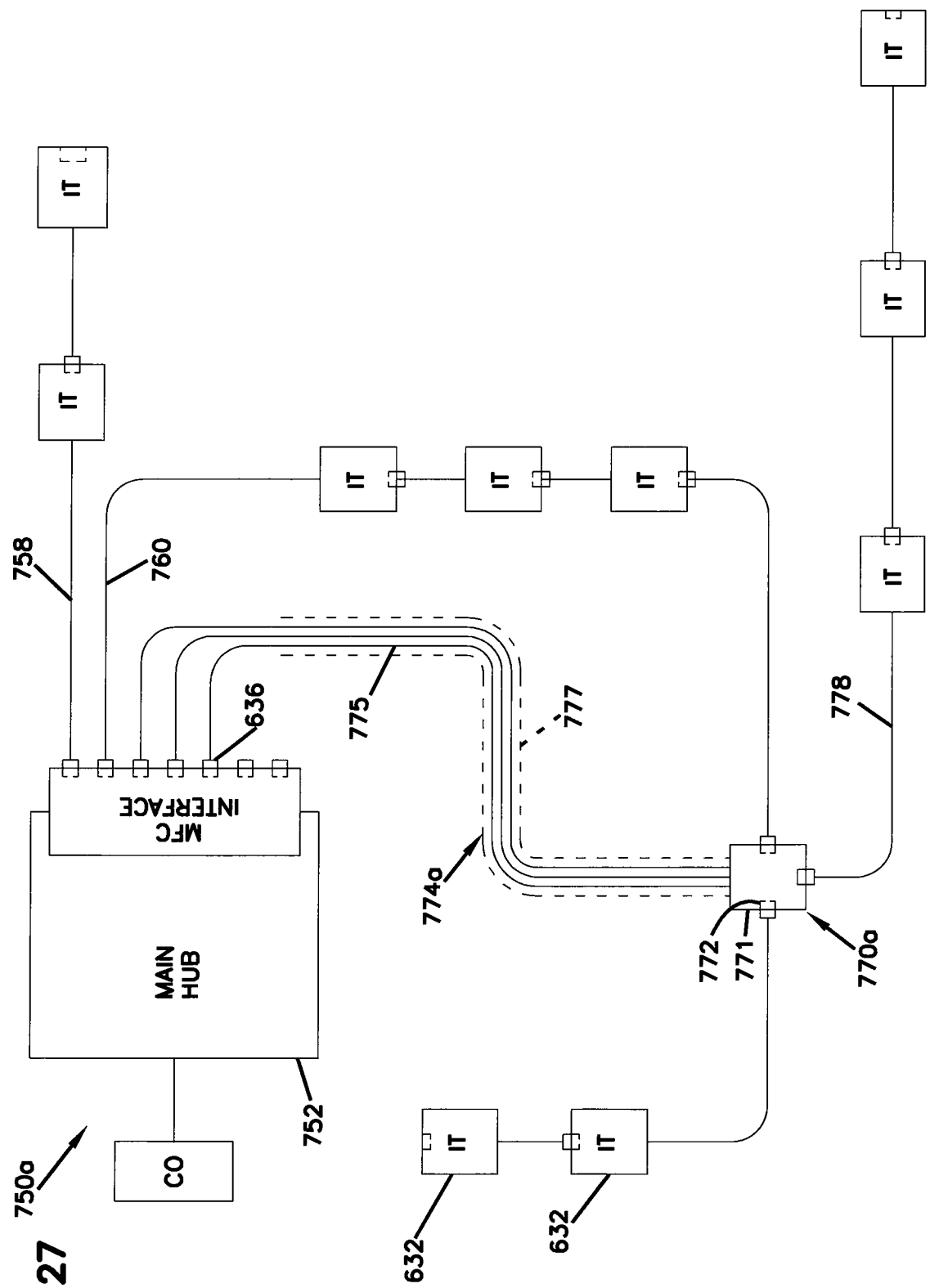
FIG. 27 illustrates still a further network architecture in accordance with the principles of the present disclosure utilizing indexing terminals.

FIG. 27 shows a modified architecture 750a having the main hub 752 and the terminal chains 758, 760 and 778. The architecture 750a has a modified remote hub 770a having a housing 771 at which ruggedized multi-fiber ports 772 are provided. The remote hub 770a includes a tether 774a defined by a plurality of cables 775 each having one end interfacing with the remote hub 770a and an opposite end terminated by a ruggedized multi-fiber connector 636. The ruggedized multi-fiber connectors 636 interface with the main hub 752 through the multi-fiber connector interface 755. A binding structure 777 holds the cables 775 together for a majority of the length of the tether 774a. The binding structure 777 can include a sheath, a cable jacket, winding or other structure.

Figure 30:
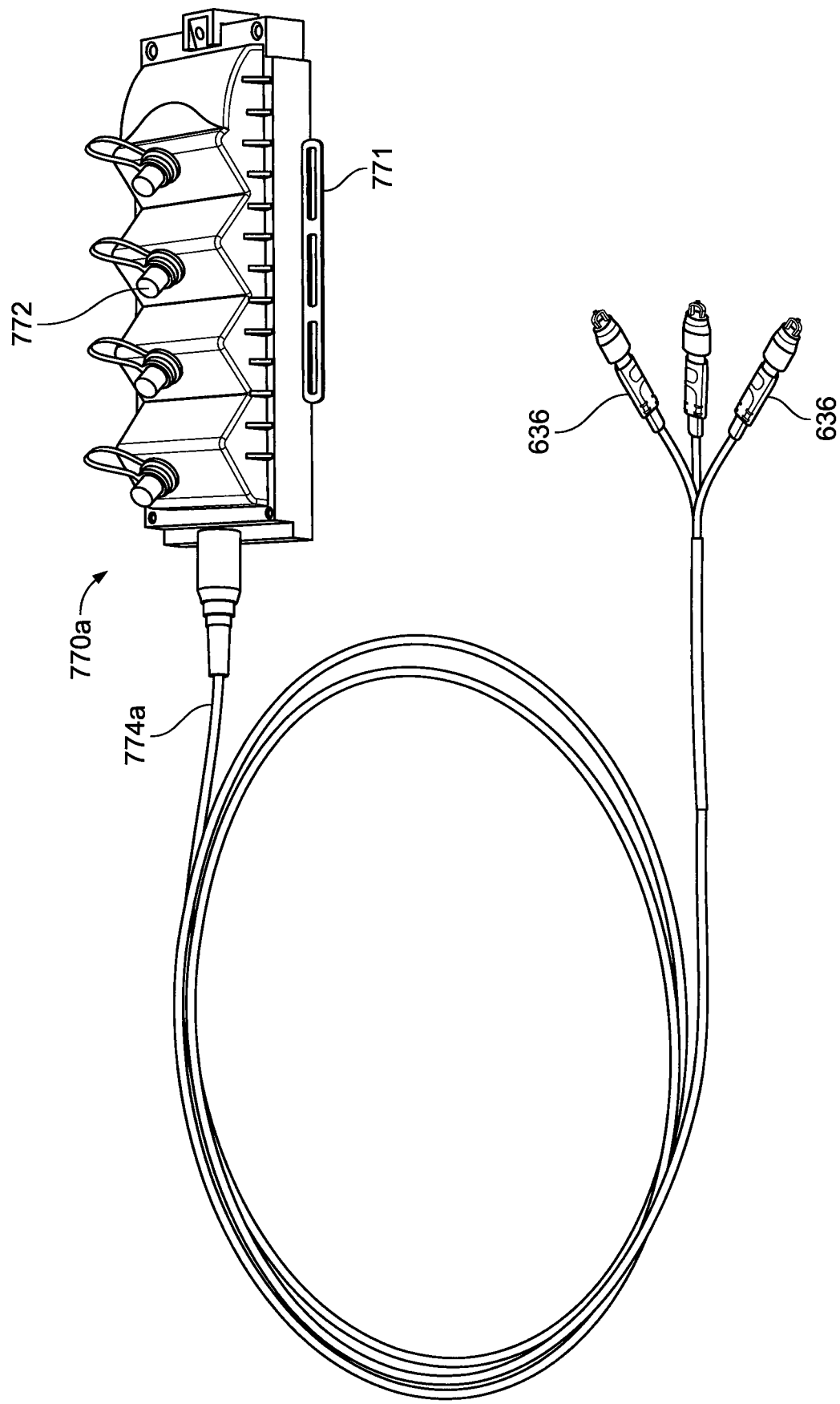
FIG. 30 illustrates another configuration suitable for use as a remote hub when incorporated into a network architecture in accordance with the principles of the present disclosure.

FIG. 30 shows an example configuration for the remote hub 770a. As shown at FIG. 30, HMFOC input connectors 636 are provided at the free end of the tether 774a. The other end of the tether enters the housing 771. The housing 771 includes a plurality of angled faces which each HMFOC output adapters 772 are mounted.

Figure 29:
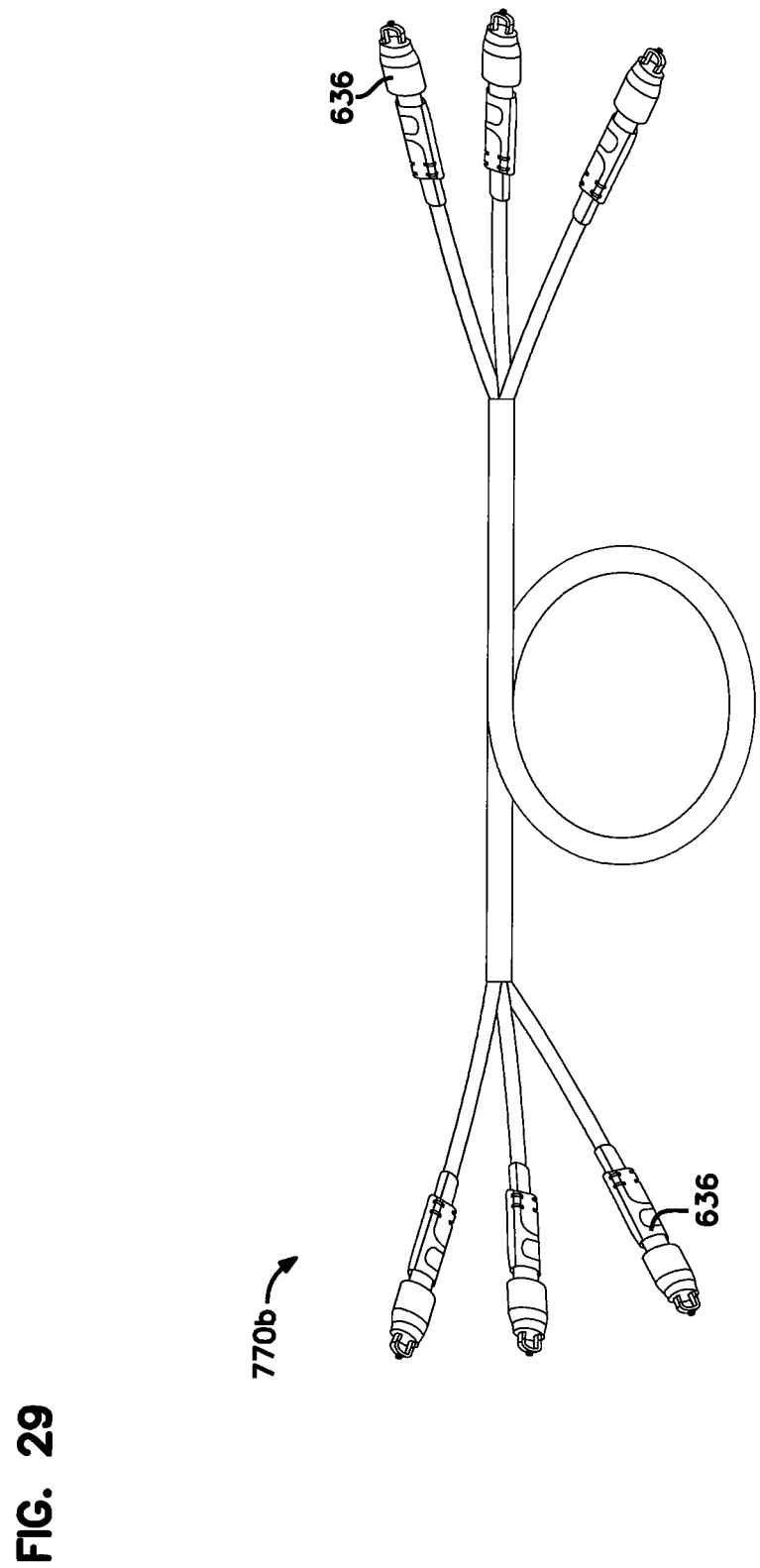
FIG. 29 illustrates an example device configured to function as a remote hub when incorporated within network architecture in accordance with the principles of the present disclosure.

FIG. 29 shows an alternative remote hub 770b that does not utilize a rigid housing. Instead, the hub 770b is shown as a cable arrangement having a central section made of flexible cable and end sections formed by independently movable tethers each terminated by an HMFOC connector 636. It will be appreciated that the hub can be formed by three separate cables that are secured together in a center flexible section by a flexible sheath or jacket. The ends of the cable are not jacketed together so as to be independently movable relative to one another. Thus, the ends of the sheathing function to define a fan-out location.

Figure 28:
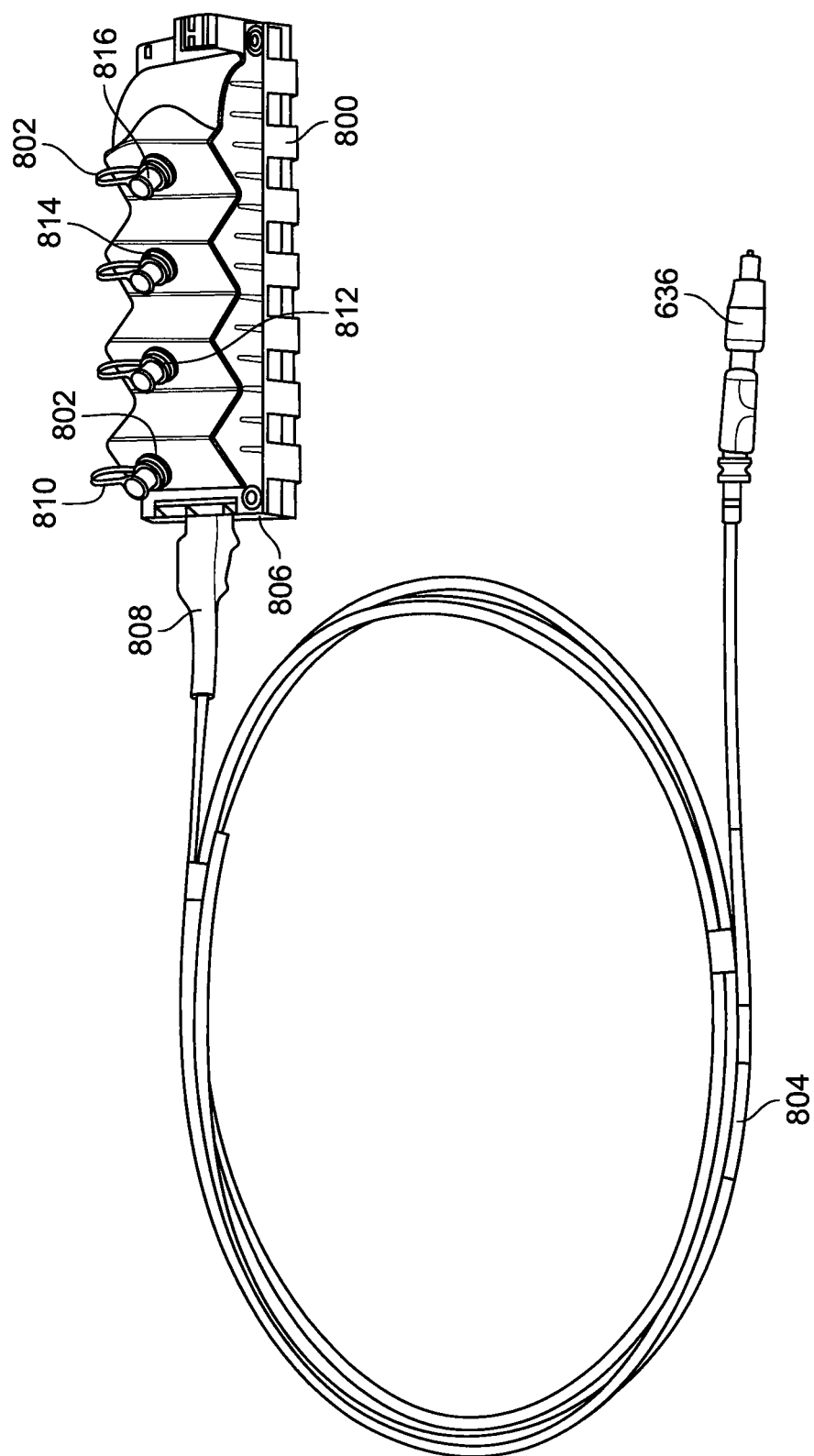
FIG. 28 illustrates an example configuration for a multi-use access and indexing terminal.

FIG. 28 shows another configuration that can be used for a multi-access terminal. The multi-access terminal includes a housing 800 including a plurality of mounting faces 802 arranged in a stepped configuration. A tether 804 enters the housing 800 through a rear end 806 of the housing 800. The entrance location can be sealed by a sealing element such as a heat-shrink sleeve 808. A free end of the tether 804 can be terminated by a ruggedized multi-fiber connector such as an HMFOC connector 636. In certain examples, tether 804 includes twelve fibers. In certain examples, eight to ten of the optical fibers are routed in an indexed manner from a multi-fiber ferrule of the connector 636 to a multi-fiber ferrule located at a ruggedized connector port 810 provided on the mounting face closest to the rear end 806 of the housing 800. Fiber positions of the multi-fiber ferrule located at the ruggedized port 810 that are not filled with indexed fibers are optically connected to a multi-fiber ferrule located at a ruggedized port 812 positioned on the second face away from the end 806 of the housing 800. It will be appreciated that the port 810 is configured for connecting to the next indexing terminal in a daisy chain while the port 812 is adapted for reverse feed applications. In certain examples, two to four fibers from the tether 804 can be dropped and routed to single-fiber ruggedized ports 814, 816 provided on the next two faces of the housing 800. It will be appreciated that example ruggedized single-fiber connector ports are disclosed in U.S. Pat. No. 7,942,590, which is hereby incorporated by reference in its entirety.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. An indexing component comprising:
   a first multi-fiber connection location;
   a second multi-fiber connection location;
   a plurality of optical fibers extending between opposite first and second ends, the first ends being disposed at the first multi-fiber connection location, the optical fibers including a first drop fiber and a plurality of indexed fibers, the second end of the first drop fiber being optically connected to an input of a passive optical splitter, the passive optical splitter having outputs optically connected to first single-fiber adapter ports, the second ends of the indexed fibers being terminated at the second multi-fiber connection location; and
   a second drop fiber terminated at the second multi-fiber connection location that is optically connected to a first single-fiber adapter port, the passive optical splitter being optically isolated from the second multi-fiber connection location.

2. The indexing component of claim 1, wherein the outputs of the passive optical splitter include eight outputs.

3. The indexing component of claim 1, wherein the first drop fiber is a forward drop fiber and wherein the second drop fiber is a reverse drop fiber.

4. The indexing component of claim 1, further comprising a terminal housing in which the passive optical splitter is disposed.

5. The indexing component of claim 4, wherein the second multi-fiber connection location, the first single-fiber adapter ports and the second single-fiber adapter port are disposed at the terminal housing.

6. The indexing component of claim 5, wherein the first multi-fiber connection location is spaced from the terminal housing by a tether cable.

7. The indexing component of claim 1, wherein the first multi-fiber connection location includes a first multi-fiber connector having a first multi-fiber ferrule.

8. The indexing component of claim 7, wherein the first multi-fiber connector is a ruggedized multi-fiber connector.

9. The indexing component of claim 8, wherein the second multi-fiber connection location includes a second multi-fiber connector having a second multi-fiber ferrule.

* * * * *